(12) United States Patent
Chae et al.

(10) Patent No.: US 11,034,390 B2
(45) Date of Patent: Jun. 15, 2021

(54) REINFORCING MEMBER

(71) Applicant: Shin Young Co., Ltd., Yeongcheon-Si (KR)

(72) Inventors: Sang Hoon Chae, Suwon-si (KR); Jeong Pil Choi, Suwon-si (KR)

(73) Assignee: SHIN YOUNG CO., LTD., Gyeongsangbuk-do (KR)

( * ) Notice: Subject to any disclaimer, the term of this patent is extended or adjusted under 35 U.S.C. 154(b) by 115 days.

(21) Appl. No.: 16/451,844

(22) Filed: Jun. 25, 2019

(65) Prior Publication Data

US 2020/0391808 A1 Dec. 17, 2020

(30) Foreign Application Priority Data

Jun. 11, 2019 (KR) .......................... 10-2019-0068543

(51) Int. Cl.
*B62D 33/00* (2006.01)
*B62D 24/00* (2006.01)
*B62D 27/02* (2006.01)
*B62D 27/04* (2006.01)

(52) U.S. Cl.
CPC ............. *B62D 33/00* (2013.01); *B62D 24/00* (2013.01); *B62D 27/02* (2013.01); *B62D 27/04* (2013.01)

(58) Field of Classification Search
CPC ........ B62D 33/00; B62D 24/00; B62D 27/02; B62D 27/04
See application file for complete search history.

(56) References Cited

U.S. PATENT DOCUMENTS

| 5,890,704 | A | * | 4/1999 | Tsutsumida | ............. | F16F 13/14 267/140.12 |
| 6,114,004 | A | | 9/2000 | Cydzik et al. | | |
| 6,135,542 | A | * | 10/2000 | Emmelmann | .......... | B62D 21/09 296/187.02 |
| 6,199,940 | B1 | * | 3/2001 | Hopton | .................. | B60J 5/0447 296/146.6 |
| 6,247,287 | B1 | | 6/2001 | Takabatake | | |
| 6,419,305 | B1 | * | 7/2002 | Larsen | .................... | B62D 25/04 296/187.02 |
| 6,491,336 | B1 | * | 12/2002 | Beckmann | ........... | B62D 29/002 296/187.01 |

(Continued)

FOREIGN PATENT DOCUMENTS

EP 1149679 A2 10/2001
EP 1759964 A1 3/2007
(Continued)

OTHER PUBLICATIONS

Extended European Search Report dated Jan. 8, 2020 in European Application No. 19182119.8.

*Primary Examiner* — Lori L Lyjak
(74) *Attorney, Agent, or Firm* — Panitch Schwarze Belisario & Nadel LLP

(57) ABSTRACT

Disclosed is a reinforcing member for improving durability of a structure which receives an external force. The reinforcing member includes a reinforcing portion for improving the durability of the structure and a restricting portion which is fixed, in position, to the structure while restricting a shift in position of the reinforcing portion such that the reinforcing portion is located in a predetermined position on the basis of the structure.

11 Claims, 13 Drawing Sheets

(56) References Cited

U.S. PATENT DOCUMENTS

| | | | | |
|---|---|---|---|---|
| 6,719,365 B2 * | 4/2004 | Lee | ............................ | B60J 7/11 |
| | | | | 296/107.04 |
| 6,863,338 B2 * | 3/2005 | Stahl | .................... | B62D 29/002 |
| | | | | 296/187.02 |
| 6,880,657 B2 * | 4/2005 | Schneider | ............ | B62D 29/002 |
| | | | | 180/68.5 |
| 8,062,464 B2 * | 11/2011 | Cropper | .............. | B60R 13/0861 |
| | | | | 156/307.3 |
| 2001/0042353 A1 * | 11/2001 | Honda | .................... | B29C 44/18 |
| | | | | 296/146.6 |
| 2013/0133771 A1 | 5/2013 | Richardson et al. | | |
| 2014/0042774 A1 | 2/2014 | Kim | | |
| 2019/0263454 A1 * | 8/2019 | Linsel | .................... | F16B 35/041 |

FOREIGN PATENT DOCUMENTS

| JP | 20020253067 A | 2/2002 |
|---|---|---|
| KR | 2003-0049769 A | 6/2003 |
| KR | 10-2005-0047364 A | 5/2005 |

\* cited by examiner

REINFORCING MEMBER

CROSS-REFERENCE TO RELATED APPLICATIONS

This application claims priority under 35 U.S.C. § 119(b) to Korean Application No. 10-2019-0068543, filed Jun. 11, 2019, the disclosure of which is incorporated herein by reference.

BACKGROUND

1. Field of the Invention

The present invention relates to a reinforcing member, and more particularly, to a reinforcing member for improving durability of a structure which receives an external force.

2. Discussion of Related Art

Recently, when a transport device such as a vehicle and the like is designed, it is necessary to consider a variety of factors. To produce a transport device having a competitive price in the global market, the factors, such as impact resistance, which resists an external impact, and fuel efficiency, which refers to an amount of fuel consumed per mileage or a unit time, should be designed to satisfy certain standards. However, the above two factors to be considered are elements that conflict with each other such that it is very difficult to satisfy certain standards.

For example, when a thickness of a steel plate included in a transport device is increased to increase impact resistance, a weight of the transport device is increased such that fuel efficiency is decreased. Also, although a high-strength steel plate may be used as the steel plate included in the transport device, a price of the transport device is increased such that competitive pricing is depressed.

SUMMARY OF THE INVENTION

The present invention is directed to providing a reinforcing member for improving impact resistance of a transport device without causing a loss in fuel efficiency.

However, aspects of the present invention will not be limited to the above-described aspect, and unstated aspects can be clearly understood by those skilled in the art through the specification and the attached drawings.

According to an aspect of the present invention, there is provided a reinforcing member for improving durability of a structure which receives an external force. The reinforcing member includes a reinforcing portion for improving the durability of the structure and a restricting portion which is fixed, in position, to the structure while restricting a shift in position of the reinforcing portion such that the reinforcing portion is located in a predetermined position on the basis of the structure.

The restricting portion may include a body portion, which restricts a shift in position of the reinforcing portion on the basis of the restricting portion, a first fixing portion, which fixes the body portion provisionally to the structure, and a second fixing portion which fixes the body portion to the structure. Also, the body portion may be fixed provisionally to the structure by the first fixing portion and then may be fixed to the structure by the second fixing portion.

The second fixing portion may not fix the body portion to the structure in a first state and may fix the body portion to the structure in a second state. Also, the body portion may be fixed provisionally to the structure by the first fixing portion and then may be fixed to the structure due to a change of the second fixing portion from the first state to the second state.

The second fixing portion may change from the first state to the second state due to heat.

The first fixing portion may be connected to the body portion, and the second fixing portion may fix the body portion to the structure by fixing the first fixing portion and the structure in the second state.

The restricting portion may include a body portion, which restricts a shift in position of the reinforcing portion on the basis of the restricting portion, and a second fixing portion which fixes the body portion to the structure. Here, the body portion may include a holding portion, which restricts a shift in position of the reinforcing portion on the basis of the body portion, and a connecting portion connected to the holding portion and the second fixing portion. The second fixing portion may not fix the connecting portion to the structure in a first state and may fix the connecting portion to the structure in a second state. Also, the holding portion may not restrict the shift in position of the reinforcing portion on the basis of the body portion in the first state and may restrict the shift in position of the reinforcing portion on the basis of the body portion in the second state.

The second fixing portion and the holding portion change from the first state to the second state due to heat.

The reinforcing member may further include an adjusting portion which adjusts whether a certain fluid flows in the reinforcing member. Here, the adjusting portion may allow the fluid to flow in the reinforcing member in a first state and to not flow in the reinforcing member in a second state.

The restricting portion may provide a disposition space which communicates with a reinforcing space that is an internal space of the reinforcing portion such that the fluid flows into the reinforcing portion. Also, the adjusting portion may be disposed in the disposition space and may adjust whether the fluid flows through a change in state.

The restricting portion may include a body portion, which restricts a shift in position of the reinforcing portion on the basis of the restricting portion, and a second fixing portion which fixes the body portion to the structure. Here, the second fixing portion may not fix the body portion to the structure in the first state and may fix the body portion to the structure in the second state. Also, the adjusting portion and the second fixing portion may change from the first state to the second state due to heat.

The body portion may include a holding portion, which restricts a shift in position of the reinforcing portion on the basis of the body portion, and a connecting portion connected to the holding portion and the second fixing portion. Here, the holding portion may not restrict the shift in position of the reinforcing portion on the basis of the body portion in the first state and may restrict the shift in position of the reinforcing portion on the basis of the body portion in the second state. Also, the adjusting portion, the second fixing portion, and the holding portion may change from the first state to the second state due to heat.

The restricting portion may include a body portion, which restricts a shift in position of the reinforcing portion on the basis of the restricting portion, a first fixing portion, which fixes the body portion provisionally to the structure, and a second fixing portion which fixes the body portion to the structure. Here, the body portion may include a first body portion and a second body portion, which is detachable from or attachable to the first body portion, and the body portion may be fixed provisionally to the structure by the first fixing portion and then may be fixed to the structure by the second fixing portion.

Another aspect of the present invention, there is provided a transport device including the above-described reinforcing member.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
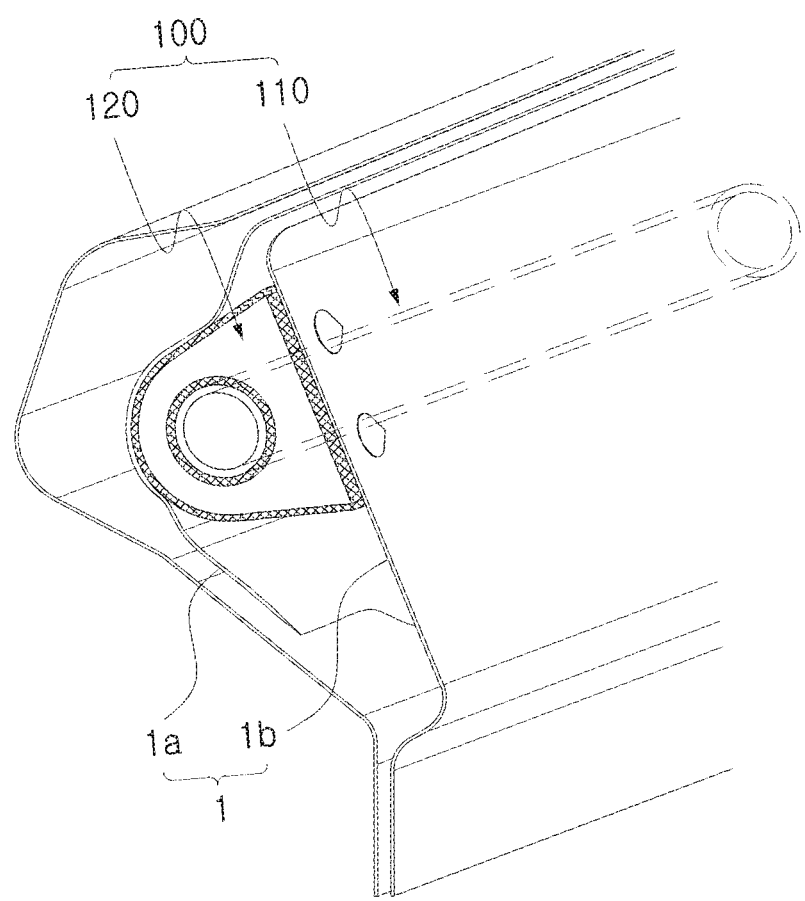
FIG. 1 is a view illustrating a state in which a reinforcing member according to a first embodiment of the present invention is combined with a structure.

Hereinafter, detailed embodiments of the present invention will be described with reference to the drawings. However, the concept of the present invention is not limited to the disclosed embodiments. It should be understood that other foregoing inventions or other embodiments included in the conceptual scope of the present invention may be easily provided by one of ordinary skill in the art through addition, change, deletion, and the like of other components but they will be included within the scope of the present invention.

Elements in the drawings with respect to each embodiment which have the same function within the same conceptual scope will be described with like reference numerals.

Throughout the specification, when it is deemed that a detailed description of well-known components or functions related to the present invention obscures the essential of the present invention, the detailed description will be omitted.

FIG. 1 is a view illustrating a state in which a reinforcing member according to a first embodiment of the present invention is coupled to a structure.

Referring to FIG. 1, a reinforcing member 100 may be connected to a structure 1, which receives an external force, to improve durability of the structure 1.

Here, the structure 1 may include at least one panel.

As an example, the structure 1 may be a side rail of a vehicle but is not limited thereto and is variously modifiable within a degree which is obvious to one of ordinary skill in the art.

As an example, the structure 1 may include an upper structure 1a and a lower structure 1b but is not limited thereto and is variously modifiable within a degree which is obvious to one of ordinary skill in the art.

The reinforcing member 100 may be disposed in a space provided by the structure 1.

The reinforcing member 100 may be connected, coupled, and/or fixed to the at least one panel included in the structure 1.

Since the reinforcing member 100 is connected to the structure 1, durability of the structure 1, which is decreased due to an internal space, may be reinforced.

The reinforcing member 100 may include a reinforcing portion 110 for improving durability of the structure 1 and a restricting portion 120 which is fixed to the structure 1 while restricting a shift in position of the reinforcing portion 110 such that the reinforcing portion 110 is located in a predetermined position on the basis of the structure 1.

Here, the reinforcing portion 110 may include a material such as steel and the like but is not limited thereto and is variously modifiable within a degree which is obvious to one of ordinary skill in the art.

Also, the reinforcing portion 110 may provide an internal space in which a fluid is movable.

As an example, the reinforcing portion 110 may be a pipe. However, the reinforcing portion 110 is not limited thereto and is variously modifiable within a degree which is obvious to one of ordinary skill in the art.

Hereinafter, a variety of embodiments of the reinforcing member 100 will be described.

Figure 2A:
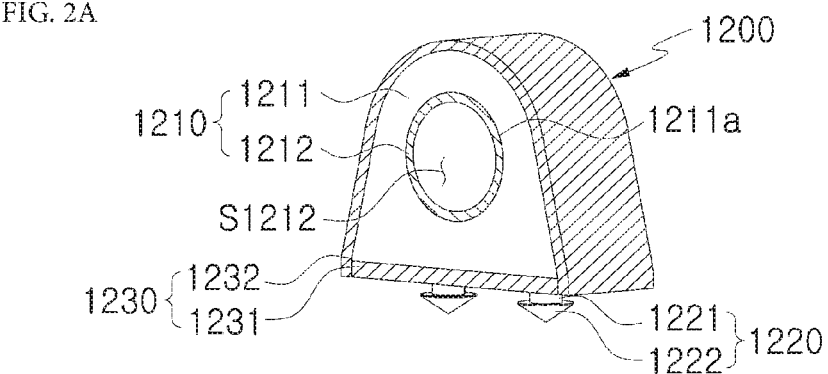
FIGS. 2A to 2C are views illustrating a restricting portion included in the reinforcing member according to the first embodiment of the present invention and a coupling relation between the restricting portion, a reinforcing portion, and the structure.
Figure 2B:
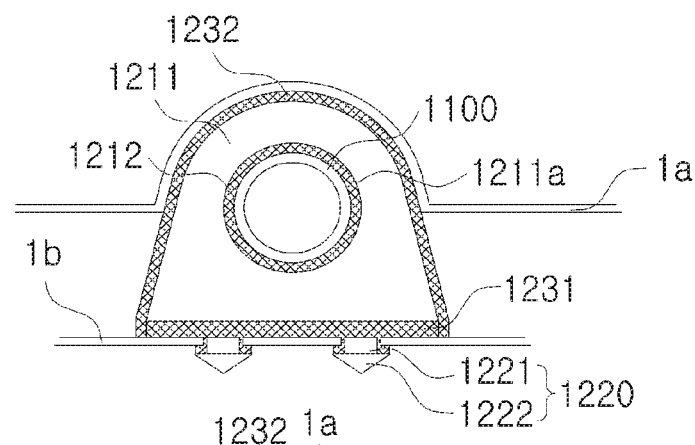
Figure 2C:
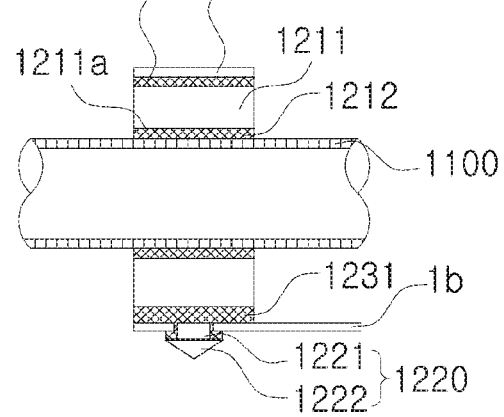

FIGS. 2A to 2C are views illustrating a restricting portion included in the reinforcing member according to the first embodiment of the present invention and a coupling relation between the restricting portion, a reinforcing portion, and the structure.

In detail, FIG. 2A is a perspective view illustrating a restricting portion included in the reinforcing member according to the first embodiment of the present invention, FIG. 2B is a front view illustrating a state in which the reinforcing member according to the first embodiment of the present invention is fixed to the structure, and FIG. 2C is a cross-sectional view illustrating a state in which the reinforcing member according to the first embodiment of the present invention is fixed to the structure.

Referring to FIG. 2A, a restricting portion 1200 may include a body portion 1210, which restricts a shift in position of a reinforcing portion 1100 on the basis of the restricting portion 1200, a first fixing portion 1220, which fixes the body portion 1210 provisionally to the structure 1, and a second fixing portion 1230 which fixes the body portion 1210 to the structure 1.

Here, the body portion 1210 may include a holding portion 1212, which restricts a shift in position of the reinforcing portion 1100 on the basis of the body portion 1210, and a connecting portion 1211 which is connected to the holding portion 1212, the second fixing portion 1230, and the first fixing portion 1220.

The second fixing portion 1230 may include a 2-1 fixing portion 1231, which is connected to a bottom surface of the connecting portion 1211, and a 2-2 fixing portion 1232 which is connected to the connecting portion 1211 to surround a side surface and a top surface of the connecting portion 1211.

The connecting portion 1211 may include an insertion surface 1211a which is an inner surface formed to pass through the connecting portion 1211 from one surface to the other surface thereof.

The holding portion 1212 may be connected to the insertion surface 1211a and may provide an insertion space S1212 in which the reinforcing portion 1100 is inserted.

For example, the holding portion 1212 may be a layer having a certain height from the insertion surface 1211a.

Here, the holding portion 1212 may provide the insertion space S1212 internally.

The reinforcing portion 1100 may be inserted into the insertion space S1212 formed by an inner surface of the holding portion 1212.

The insertion space S1212 is variously changeable by a shape of the reinforcing portion 1100.

As an example, when the reinforcing portion 1100 is a pipe, the insertion space S1212 has a cylindrical shape but the present invention is not limited thereto.

The reinforcing portion 1100 may be inserted into the connecting portion 1211.

Therefore, the reinforcing portion 1100 may be located in a predetermined position on the basis of the structure 1.

When the reinforcing portion 1100 is inserted into the insertion space S1212, the reinforcing portion 1100 may not shift in position to upper, lower, leftward, and rightward directions due to the connecting portion 1211.

The connecting portion 1211 may be connected to the first fixing portion 1220.

The first fixing portion 1220 may be formed to extend from at least a part of the bottom surface of the connecting portion 1211.

The connecting portion 1211 may be connected to the second fixing portion 1230.

The 2-1 fixing portion 1231 may be connected to at least a part of the bottom surface of the connecting portion 1211.

As an example, the 2-1 fixing portion 1231 may be connected to an entirety of the bottom surface of the connecting portion 1211.

Also, the first fixing portion 1220 and the 2-1 fixing portion 1231 may be connected to each other.

As an example, the 2-1 fixing portion 1231 may be a layer having a certain height from the bottom surface of the connecting portion 1211, and the first fixing portion 1220 may extend from the bottom surface of the connecting portion 1211 toward an outside of the 2-1 fixing portion 1231 while passing through the 2-1 fixing portion 1231.

The holding portion 1212 may be connected to at least a part of the insertion surface 1211a and may form a layer having a certain height.

The holding portion 1212 cannot restrict a shift in position of the reinforcing portion 1100 on the basis of the body portion 1210 in a first state and may restrict the shift in position of the reinforcing portion 1100 on the basis of the body portion 1210 in a second state.

Here, the first state may be a state in which although the holding portion 1212 and the reinforcing portion 1100 are connected to each other, the reinforcing portion 1100 may shift in position when an external force is applied to the reinforcing portion 1100.

Here, the second state may be a state in which the holding portion 1212 and the reinforcing portion 1100 are connected to each other and the reinforcing portion 1100 may not shift in position when an external force is applied thereto.

In detail, referring to FIG. 2A, the reinforcing portion 1100 (refer to FIGS. 2B and 2C) is inserted into the insertion space S1212 provided by the holding portion 1212 such that the holding portion 1212 and the reinforcing portion 1100 may be connected to each other.

Here, when an external force is applied to the reinforcing portion 1100, the reinforcing portion 1100 may shift in position. Referring to FIGS. 2B and 2C, when heat acts on the holding portion 1212, the holding portion 1212 changes from the first state to the second state such that a volume thereof expands simultaneously while a bonding function is provided so as to bond the connecting portion 1211 and the reinforcing portion 1100 to each other.

The holding portion 1212 may be structural foam but is not limited thereto and is variously modifiable within a degree which is obvious to one of ordinary skill in the art.

The first fixing portion 1220 may be formed to extend from the bottom surface of the connecting portion 1211.

The first fixing portion 1220 may include a 1-1 fixing portion 1221 connected to the connecting portion 1211 and a 1-2 fixing portion 1222 connected to the 1-1 fixing portion 1221 and configured to fix the connecting portion 1211 provisionally to the structure 1.

The 1-2 fixing portion 1222 may have a gradual incline.

As an example, the 1-2 fixing portion 1222 may be cone shaped but is not limited thereto and a shape of the 1-2 fixing portion is variously changeable within a degree which is obvious to one of ordinary skill in the art.

The first connecting portion 1220 may be connected to the body portion 1210.

The first fixing portion 1220 may fix the body portion 1210 provisionally to the structure 1.

The 1-1 fixing portion 1221 may be inserted into a hole formed in the structure 1 so as to fix the body portion 1210 provisionally to the structure 1.

Here, provisional fixing may mean a fixed state in which when an external force acts on the first fixing portion 1220 while the first fixing portion 1220 is connected to the structure 1, the body portion 1210 is separable from the structure 1.

Also, provisional fixing may mean a fixed state in which when an external force acts on the body portion 1210 while the body portion 1210 is connected to the structure 1 by the first fixing portion 1220, a distance between the first fixing portion 1220 and the structure 1 is changeable.

Also, provisional fixing may mean a fixed state in which when an external force acts on the body portion 1210 while the body portion 1210 is connected to the structure 1 by the first fixing portion 1220, the connecting portion 1211 is shakeable.

The 2-1 fixing portion 1231 may be formed as a layer having a certain height from the bottom surface of the connecting portion 1211.

The 2-2 fixing portion 1232 may be formed as a layer having a certain height from the side surface and the top surface of the connecting portion 1211.

The second fixing portion 1230 may not fix the body portion 1210 to the structure 1 in a first state and may fix the body portion 1210 to the structure 1 in a second state.

Here, when the second fixing portion 1230 is in the first state, the body portion 1210 (the connecting portion 1211) is connected to the structure 1 by the first fixing portion 1220 but the body portion 1210 (the connecting portion 1211) may shift in position when an external force acts on the body portion 1210 (the connecting portion 1211).

Here, when the second fixing portion 1230 is in the second state, the body portion 1210 (the connecting portion 1211) is connected to the structure 1 by the first fixing portion 1220 and the body portion 1210 (the connecting portion 1211) may not shift in position when an external force acts on the body portion 1210 (the connecting portion 1211).

In detail, referring to FIG. 2A, when the body portion 1210 is fixed provisionally to the structure 1 (refer to FIGS. 2B and 2C) by the first fixing portion 1220, the second fixing portion 1230 may be connected to the structure 1. Here, when an external force is applied to the body portion 1210, the body portion 1210 may shift in position.

Referring to FIGS. 2B and 2C, when heat acts on the second fixing portion 1230 in the first state, a volume of the second fixing portion 1230 expands such that a bonding function may be implemented.

In this state, as the second fixing portion 1230 cools down, the second fixing portion 1230 may change to the second state and may bond the body portion 1210 and the structure 1 to each other.

As an example, while the body portion 1210 is fixed to the lower structure 1b provisionally by the first fixing portion 1220, when heat acts on the second fixing portion 1230, the 2-1 fixing portion 1231 and the 2-2 fixing portion 1232 may change from the first state to the second state.

Therefore, the body portion 1210 may be fixed to the lower structure 1b by the 2-1 fixing portion 1231, and the body portion 1210 may be fixed to the upper structure 1a by the 2-2 fixing portion 1232.

That is, after the body portion 1210 is fixed provisionally to the structure 1 by the first fixing portion 1220, the second fixing portion 1230 changes from the first state to the second state such that the body portion 1210 may be fixed to the structure 1.

Also, during a process in which the second fixing portion 1230 changes from the first state to the second state, fluidity of the second fixing portion 1230 may be increased.

Therefore, the 2-1 fixing portion 1231, which changes from the first state to the second state and is heated at a certain temperature, may be moved within a distance between the first fixing portion 1220 and the structure 1.

Here, as the 2-1 fixing portion 1231 heated at a certain temperature cools down, the 2-1 fixing portion 1231 may change to the second state and may bond the first fixing portion 1220 and the structure 1 to each other.

Therefore, the body portion 1210 may be more effectively fixed to the structure 1.

Here, the second fixing portion 1230 may mean a structural foam but is not limited thereto and is variously modifiable within a degree which is obvious to one of ordinary skill in the art.

A state-changing process of the second fixing portion 1230 may be applied equally to the holding portion 1212.

The above-described combination process may be performed by heat coincidentally.

In detail, when heat acts on the reinforcing member while the reinforcing portion 1100 is inserted into the insertion space S1212 and the connecting portion 1211 is fixed provisionally to the structure 1 by the first fixing portion 1220, the holding portion 1212 may change from the first state to the second state and may restrict a shift in position of the reinforcing portion 1100 on the basis of the connecting portion 1211, and the second fixing portion 1230 may change from the first state to the second state such that the connecting portion 1211 may be fixed to the structure 1.

Therefore, a manufacturing process may be simplified.

Figure 3A:
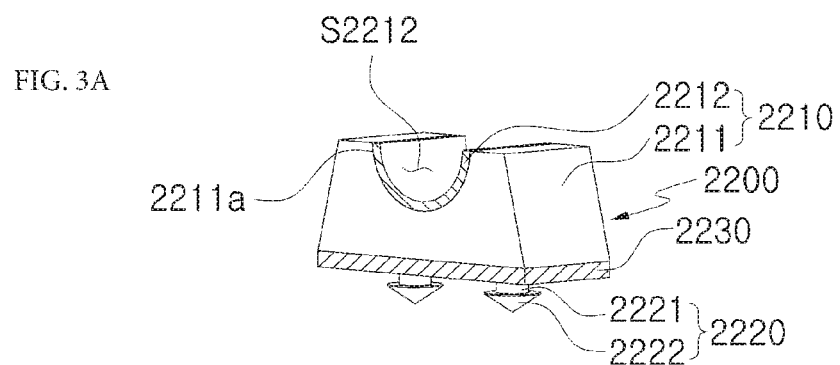
FIGS. 3A to 3C are views illustrating a restricting portion included in a reinforcing member according to a second embodiment of the present invention and a coupling relation between the restricting portion, a reinforcing portion, and the structure.
Figure 3B:
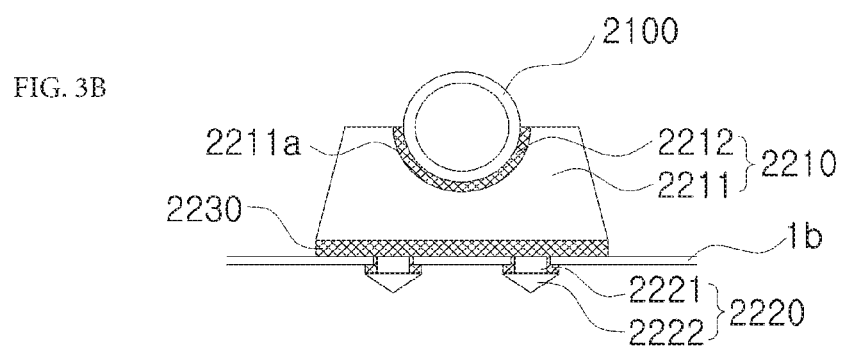
Figure 3C:
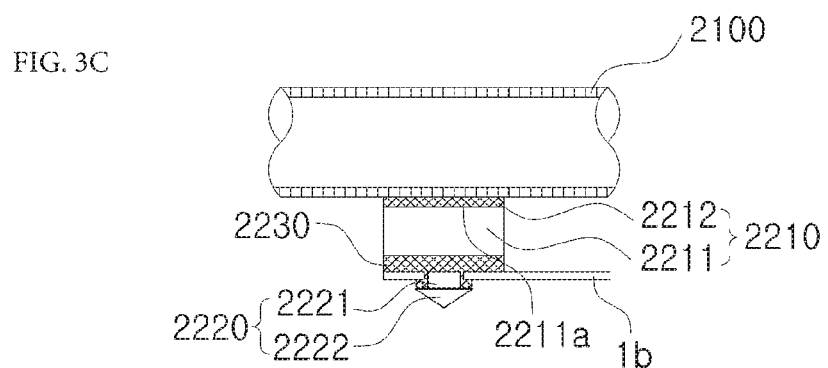

FIGS. 3A to 3C are views illustrating a restricting portion included in a reinforcing member according to a second embodiment of the present invention and a coupling relation between the restricting portion, a reinforcing portion, and the structure.

In detail, FIG. 3A is a perspective view illustrating a restricting portion included in the reinforcing member according to the second embodiment of the present invention, FIG. 3B is a front view illustrating a state in which the reinforcing member according to the second embodiment of the present invention is fixed to the structure, and FIG. 3C is a cross-sectional view illustrating a state in which the reinforcing member according to the second embodiment of the present invention is fixed to the structure.

Hereinafter, a detailed description within a range overlapping with the above description may be omitted.

Referring to FIG. 3A, a restricting portion 2200 may include a body portion 2210, which restricts a shift in position of a reinforcing portion 2100 on the basis of the restricting portion 2200, a first fixing portion 2220, which fixes the body portion 2210 provisionally to the structure 1, and a second fixing portion 2230 which fixes the body portion 2210 to the structure 1.

Here, the body portion 2210 may include a holding portion 2212, which restricts a shift in position of the reinforcing portion 2100 on the basis of the body portion 2210, and a connecting portion 2211 which is connected to the holding portion 2212, the second fixing portion 2230, and the first fixing portion 2220.

Also, the first fixing portion 2220 may include a 1-1 fixing portion 2221 connected to the connecting portion 2211 and a 1-2 fixing portion 2222 connected to the 1-1 fixing portion 2221 and configured to fix the connecting portion 2211 provisionally to the structure 1.

The connecting portion 2211 may include a mounting surface 2211a which is depressed from a top surface of the connecting portion 2211 to provide a certain space.

The holding portion 2212 may be connected to or disposed on the mounting surface 2211a.

The holding portion 2212 may be disposed in a position opposite to the first fixing portion 2220 and the second fixing portion 2230 on the basis of the connecting portion 2211.

As an example, the holding portion 2212 may be located on the top surface of the connecting portion 2211, and the first fixing portion 2220 and the second fixing portion 2230 may be located on a bottom surface of the connecting portion 2211.

An inner surface of the holding portion 2212 may provide a mounting space S2212 in which the reinforcing portion 2100 is mountable.

In detail, the connecting portion 2211 may include the mounting surface 2211a, which is depressed from the top surface of the connecting portion 2211 and provides a certain space, and the holding portion 2212 may be disposed on the mounting surface 2211a and may provide the mounting space S2212.

The holding portion 2212 may come into contact with the mounting surface 2211a and may form a layer having a certain height.

The mounting space S2212 is variously changeable by a shape of the reinforcing portion 2100.

The reinforcing portion 2100 may be disposed in the mounting space S2212 such that the reinforcing portion 2100 may be located in a predetermined position on the basis of the structure 1.

When the reinforcing portion 2100 is mounted in the mounting space S2212 of the connecting portion 2211, the reinforcing portion 2100 may be restricted in shifting in position in leftward, rightward, and lower directions on the basis of the connecting portion 2211.

Referring to FIG. 3A, the reinforcing portion 2100 (refer to FIGS. 3B and 3C may be disposed in the mounting space S2212, and the body portion 2210 may be fixed provisionally to the structure 1 (refer to FIGS. 3B and 3C) by the first fixing portion 2220.

Referring to FIGS. 3B and 3C, when heat acts on the reinforcing member, the holding portion 2212 changes from a first state to a second state such that the reinforcing portion 2100 may be fixed to the body portion 2210 and the second fixing portion 2230 changes from a first state to a second state such that the body portion 2210 may be fixed to the structure 1.

In detail, as an example, referring to FIGS. 3B and 3C, when heat acts on the reinforcing member, the holding portion 2212 changes from the first state to the second state such that the reinforcing portion 2100 may be fixed to the connecting portion 2211 and the second fixing portion 2230 changes from the first state to the second state such that the connecting portion 2211 may be fixed to the structure 1.

As an example, the body portion 2210 may be fixed provisionally to the lower structure 1b by the first fixing portion 2220 and the second fixing portion 2230 changes from a first state to a second state such that the body portion 2210 may be fixed to the lower structure 1b.

The above-described process may be performed by heat coincidently.

Figure 4A:
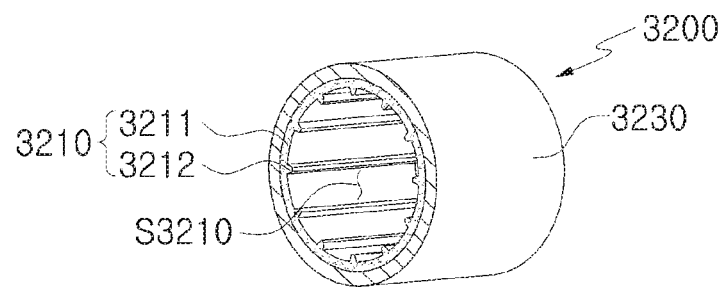
FIGS. 4A to 4C are views illustrating a restricting portion included in a reinforcing member according to a third embodiment of the present invention and a coupling relation between the restricting portion, a reinforcing portion, and the structure.
Figure 4B:
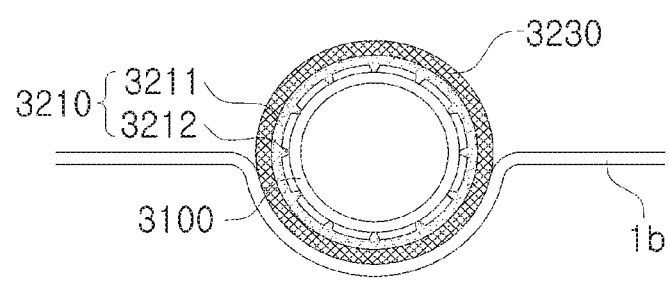
Figure 4C:
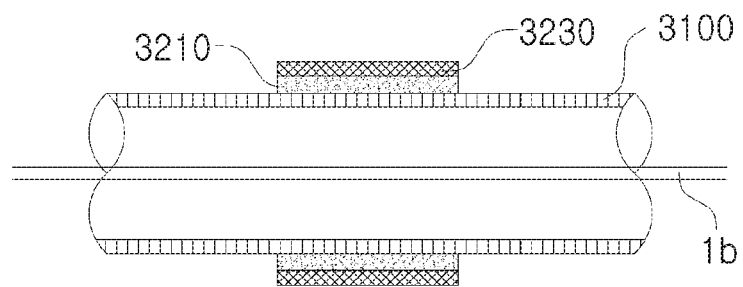

FIGS. 4A to 4C are views illustrating a restricting portion included in a reinforcing member according to a third embodiment of the present invention and a coupling relation between the restricting portion, a reinforcing portion, and the structure.

In detail, FIG. 4A is a perspective view illustrating a restricting portion included in the reinforcing member according to the third embodiment of the present invention, FIG. 4B is a front view illustrating a state in which the reinforcing member according to the third embodiment of the present invention is fixed to the structure, and FIG. 4C is a cross-sectional view illustrating a state in which the reinforcing member according to the third embodiment of the present invention is fixed to the structure.

Hereinafter, a detailed description within a range overlapping with the above description may be omitted.

Referring to FIG. 4, a restricting portion 3200 may include a body portion 3210, which restricts a shift in position of a reinforcing portion 3100 on the basis of the restricting portion 3200, and a second fixing portion 3230 which fixes the body portion 3210 to the structure 1.

Here, the body portion 3210 may include a holding portion 3212, which restricts a shift in position of the reinforcing portion 3100 on the basis of the body portion 3210, and a connecting portion 3211 which is connected to the holding portion 3212 and the second fixing portion 3230.

The connecting portion 3211 and the holding portion 3212 may provide an insertion space S3210 in which the reinforcing portion 3100 is insertable.

The holding portion 3212 may be formed to protrude from an inner surface of the connecting portion 3211.

When the reinforcing portion 3100 is inserted in to the insertion space S3210, the holding portion 3212 may pressurize the reinforcing portion 3100 to prevent the reinforcing portion 3100 from shifting in position.

The holding portion 3212 and the connecting portion 3211 may be integrally formed but are not limited thereto and are variously modifiable within a degree which is obvious to one of ordinary skill in the art.

The second fixing portion 3230 may be formed as a layer which surrounds the connecting portion 3211 and has a certain height.

The second fixing portion 3230 may be formed as a layer which comes into contact with an outer surface of the connecting portion 3211 and has a certain height.

Referring to FIG. 4A, while the reinforcing portion 3100 (refer to FIGS. 4B and 4C) is inserted in the insertion space S3210, the second fixing portion 3230 may be mounted on the structure 1 (refer to FIGS. 3B and 3C).

Referring to FIGS. 4B and 4C, when heat acts on the reinforcing member, the second fixing portion 3230 changes from a first state to a second state such that the body portion 3210 may be fixed to the structure 1.

As an example, since the second fixing portion 3230 changes from the first state to the second state, the body portion 3210 may be fixed to the lower structure 1b.

The second fixing portion may be structural foam but the present invention is not limited thereto.

Figure 5A:
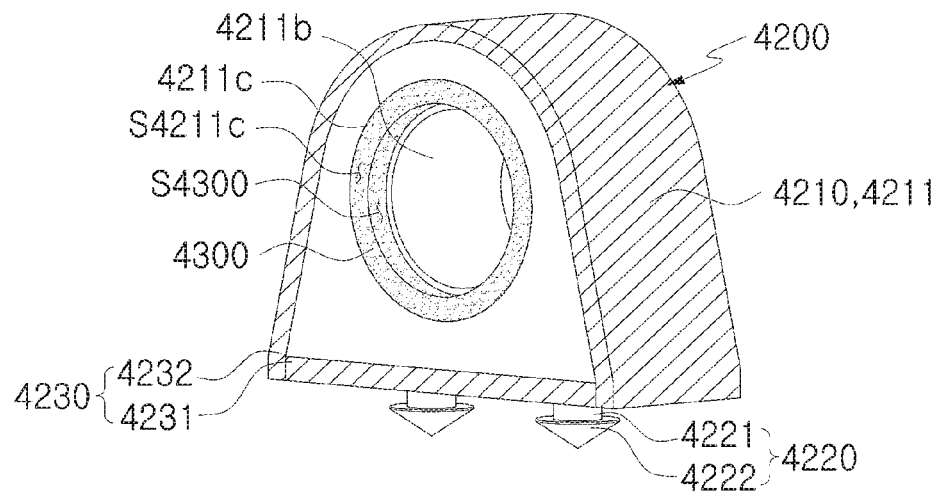
FIGS. 5A and 5B are perspective views illustrating a restricting portion included in a reinforcing member according to a fourth embodiment of the present invention.
Figure 5B:
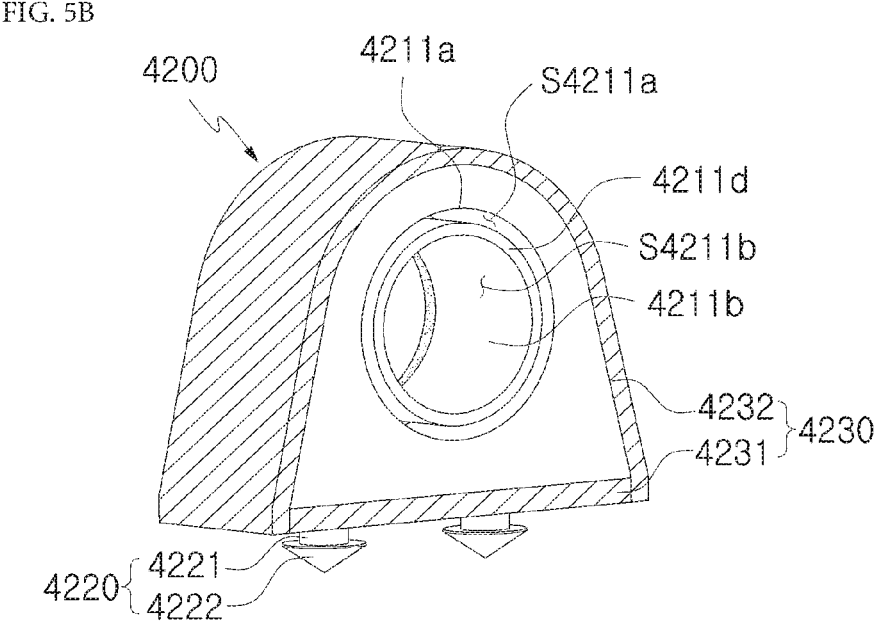
Figure 6A:
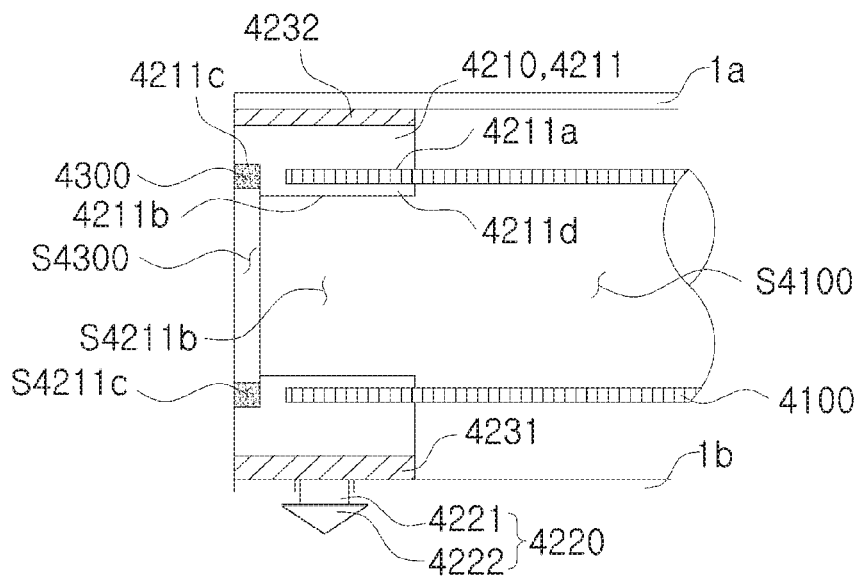
FIGS. 6A and 6B are views illustrating a coupling relation between the restricting portion of FIG. 5A, a reinforcing portion, and the structure.
Figure 6B:
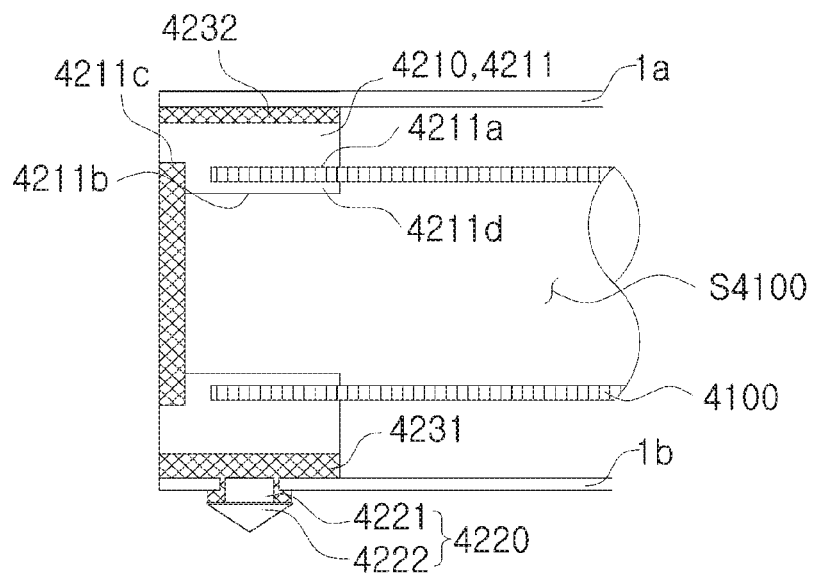

FIGS. 5A and 5B are perspective views illustrating a restricting portion included in a reinforcing member according to a fourth embodiment of the present invention, and FIGS. 6A and 6B are views illustrating a coupling relation between the restricting portion of FIG. 5A, a reinforcing portion, and the structure.

In detail, FIG. 5A is a front perspective view illustrating the restricting portion included in the reinforcing member according to the fourth embodiment of the present invention, FIG. 5B is a rear perspective view illustrating the restricting portion included in the reinforcing member according to the fourth embodiment of the present invention, FIG. 6A is a cross-sectional view illustrating a state in which the reinforcing member according to the fourth embodiment of the present invention is fixed provisionally to the structure, and FIG. 6B is a cross-sectional view illustrating a state in which the reinforcing member according to the fourth embodiment of the present invention is fixed to the structure.

Hereinafter, a detailed description within a range overlapping with the above description may be omitted.

Referring to FIG. 5A, the reinforcing member may further include an adjusting portion 4300 which adjusts whether a certain fluid flows in a reinforcing portion 4100 (refer to FIG. 6A).

A restricting portion 4200 may include a body portion 4210, which restricts a shift in position of the reinforcing portion 4100 on the basis of the restricting portion 4200, a first fixing portion 4220, which fixes the body portion 4210 provisionally to the structure 1, and a second fixing portion 4230 which fixes the body portion 4210 to the structure 1.

Also, the body portion 4210 may include a connecting portion 4211 connected to the second fixing portion 4230, the first fixing portion 4220, and the adjusting portion 4300.

Also, the first fixing portion 4220 may include a 1-1 fixing portion 4221 connected to the connecting portion 4211 and a 1-2 fixing portion 4222 connected to the 1-1 fixing portion 4221 and configured to fix the connecting portion 4211 provisionally to the structure 1.

Also, the second fixing portion 4230 may include a 2-1 fixing portion 4231, which is connected to a bottom surface of the connecting portion 4211, and a 2-2 fixing portion 4232 which is connected to the connecting portion 4211 to surround a side surface and a top surface of the connecting portion 4211.

The connecting portion 4211 may include a placement surface 4211c, a through surface 4211b, an insertion surface 4211a, and a separation portion 4211d, which are formed as inner surfaces of the connecting portion 4211.

An inner surface of the connecting portion 4211, which is formed by depressing a part of one surface of the connecting portion 4211, may be referred to as the placement surface 4211c.

An inner surface of the connecting portion 4211, which is formed by depressing a part of the other surface of the connecting portion 4211, may be referred to as the through surface 4211b.

The placement surface 4211c and the through surface 4211b may be formed to have a step therebetween.

The adjusting portion 4300 may be disposed on the placement surface 4211c.

The adjusting portion 4300 in a first state may be connected to the placement surface 4211c.

The adjusting portion 4300 may be formed as a layer having a certain height from the placement surface 4211c.

The placement surface 4211c may provide a disposition space S4211c in which the adjusting portion 4300 is disposed.

The disposition space S4211c may be provided as a circular ring shape along the placement surface 4211c but is not limited thereto and is variously modifiable within a degree which is obvious to one of ordinary skill in the art.

As an example, the adjusting portion 4300 in the first state may have a ring shape.

However, the shape of the adjusting portion 4300 in the first state is not limited thereto and is variously modifiable within a degree which is obvious to one of ordinary skill in the art.

An inner surface of the adjusting portion 4300 may provide a flow space S4300 in which a fluid flows.

As an example, the inner surface of the adjusting portion 4300 may form a uniform surface like the through surface 4211b.

However, the present invention is not limited thereto, and structural arrangement of the inner surface of the adjusting portion 4300 and the through surface 4211b is variously modifiable within a degree which is obvious to one of ordinary skill in the art.

As an example, the inner surface of the adjusting portion 4300 may be formed to have a step with the through surface 4211b.

A part of the other surface of the connecting portion 4211 is depressed such that an insertion space S4211a, in which one end of the reinforcing portion 4100 is inserted, may be formed.

As a detailed example, the other surface of the connecting portion 4211 is depressed including the through surface 4211b such that the insertion space S4211a may be formed.

As an example, the insertion space S4211a may have a hollow cylindrical shape.

However, the shape of the insertion space S4211a is not limited thereto and is variously modifiable within a degree which is obvious to one of ordinary skill in the art.

The connecting portion 4211, which is inside the insertion space S4211a, may be referred to as the separation portion 4211d.

A connecting space S4211b provided by the through surface 4211b, which is an inner surface of the separation portion 4211d, may communicate with a reinforcing space S4100 which is an internal space of the reinforcing portion 4100.

The insertion surface 4211a and an outer surface of the separation portion 4211d may provide the insertion space S4211a in which the reinforcing portion 4100 is inserted.

The connecting space S4211b and the insertion space S4211a may be separated by the separation portion 4211d.

The flow space S4300 may communicate with the connecting space S4211b.

The connecting space S4211b may communicate with the reinforcing space S4100 which is an internal space of the reinforcing portion 4100.

That is, the flow space S4300 may communicate with the reinforcing space S4100 due to the connecting space S4211b.

Therefore, a fluid may flow toward the reinforcing space S4100 through the flow space S4300 and the connecting space S4211b. On the other hand, the fluid may flow through the reinforcing space S4100, the connecting portion S4211b, and the flow space S4300.

The connecting space S4211b may be provided by the separation portion 4211d.

The disposition space S4211c may be spatially separated from the insertion space S4211a.

The disposition space S4211c may be formed on the connecting portion 4211 to be opposite to the insertion space S4211a on the basis of a center of the connecting portion 4211.

Referring to FIGS. 6A and 6B, the adjusting portion 4300 may allow the fluid to flow into the reinforcing portion 4100 in a first state and not allow the fluid to flow into the reinforcing portion 4100 in a second state.

Here, the adjusting portion 4300 in the first state may be disposed in the disposition space 4211c.

Also, the inner surface of the adjusting portion 4300 in the first state may be in a state of providing the flow space S4300.

Also, at least a part of the adjusting portion 4300 in a second state is disposed in the disposition space S4211c and the flow space S4300 defined when the adjusting portion 4300 is in the first state such that the inner surface of the adjusting portion 4300 may be in a state of being incapable of providing the flow space S4300.

Therefore, when the adjusting portion 4300 changes from the first state to the second state, an outside of the connecting portion 4211 and the reinforcing space S4100 may be separated spatially.

Here, the adjusting portion 4300 may change from the first state to the second state due to heat.

As an example, the adjusting portion 4300 may be a foaming filler but is not limited thereto and is variously modifiable within a degree which is obvious to one of ordinary skill in the art.

The reinforcing portion 4100 may be forcibly inserted into the insertion space S4211a and fixed to the connecting portion 4211.

The body portion 4210 may be fixed provisionally to the structure 1 by the first fixing portion 4220 and may be fixed to the structure 1 by the second fixing portion 4230, and a detailed description thereof may be omitted within a range overlapping with the above description.

The above-described process may be performed by heat coincidentally.

In detail, referring to FIG. 6A, the reinforcing portion 4100 may be inserted into the insertion space S4211a, and the body portion 4210 may be fixed to the structure 1 provisionally by the first fixing portion 4220.

Referring to FIG. 6B, when heat acts on the reinforcing member, the adjusting portion 4300 changes from the first state to the second state so as to prevent a certain fluid from flowing to the reinforcing space S4100 or from flowing from the reinforcing space S4100 to an outside of the connecting portion 4211 and the second fixing portion 4230 changes from a first state to a second state such that the body portion 4210 may be fixed to the structure 1.

As an example, when heat acts on the second fixing portion 4230, the 2-1 fixing portion 4231 and the 2-2 fixing portion 4232 change from a first state to a second state such that the body portion 4210 may be fixed to the lower structure 1b by the 2-1 fixing portion 4231 and may be fixed to the upper structure 1a by the 2-2 fixing portion 4232.

Figure 7A:
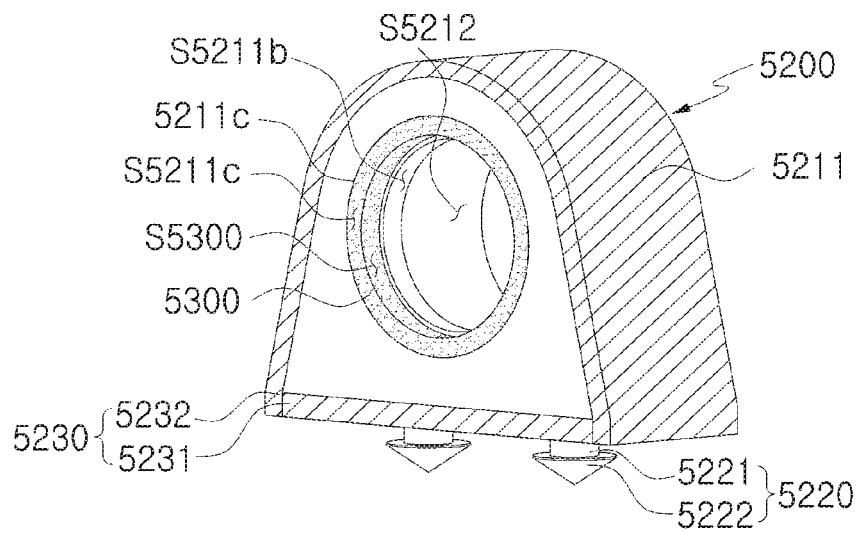
FIGS. 7A and 7B are perspective views illustrating a restricting portion included in a reinforcing member according to a fifth embodiment of the present invention.
Figure 7B:
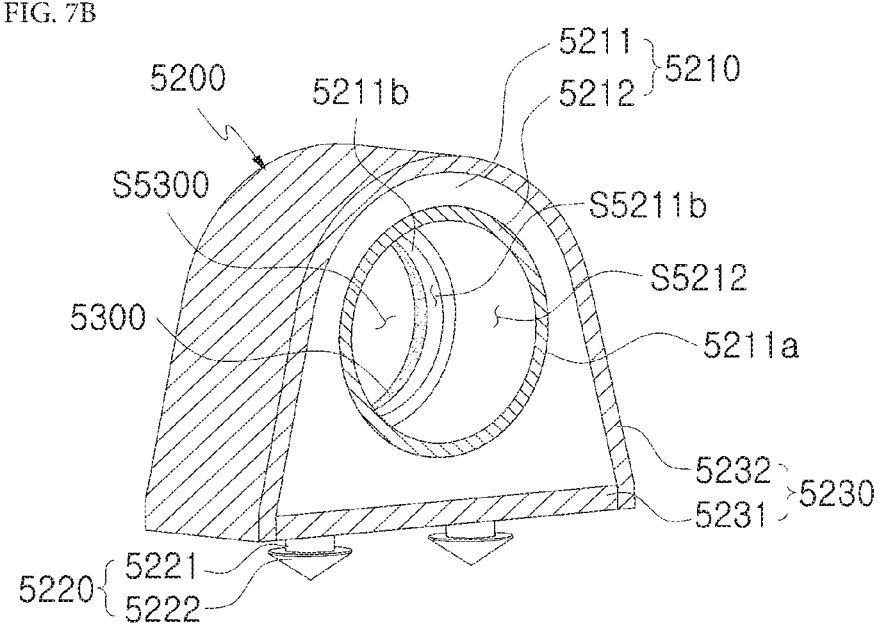
Figure 8A:
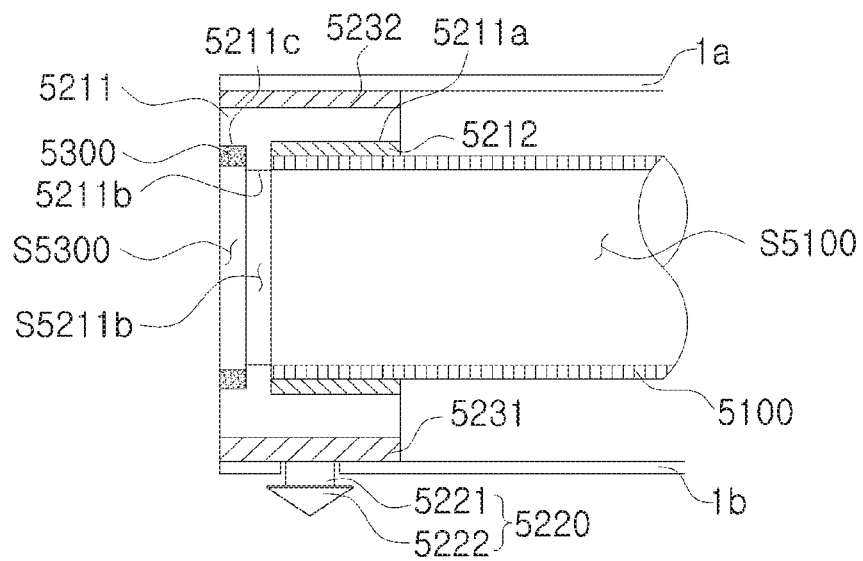
FIGS. 8A and 8B are views illustrating a coupling relation between the restricting portion of FIG. 7A, a reinforcing portion, and the structure.
Figure 8B:
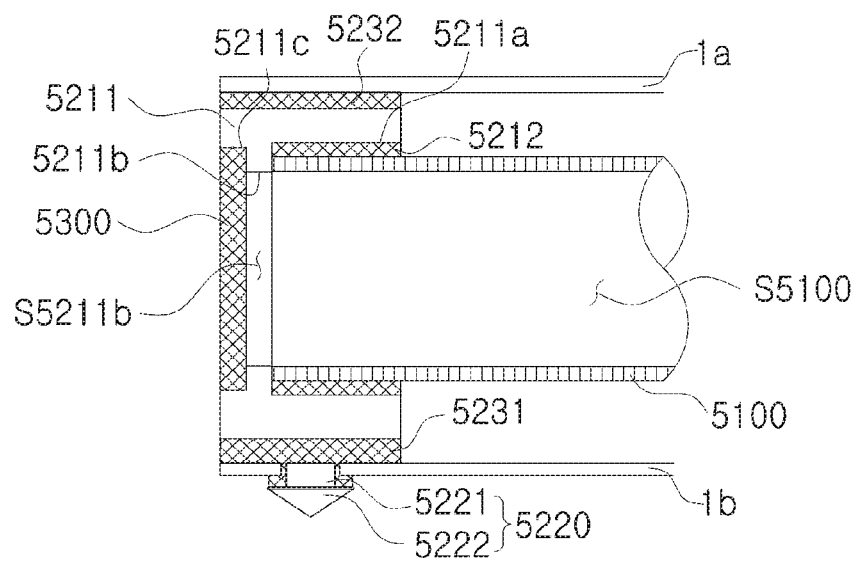

FIGS. 7A and 7B are perspective views illustrating a restricting portion included in a reinforcing member according to a fifth embodiment of the present invention, and FIGS. 8A and 8B are views illustrating a coupling relation between the restricting portion of FIG. 7, a reinforcing portion, and the structure.

In detail, FIG. 7A is a front perspective view illustrating the restricting portion included in the reinforcing member according to the fifth embodiment of the present invention, FIG. 7B is a rear perspective view illustrating the restricting portion included in the reinforcing member according to the fifth embodiment of the present invention, FIG. 8A is a cross-sectional view illustrating a state in which the reinforcing member according to the fifth embodiment of the present invention is fixed provisionally to the structure, and FIG. 8B is a cross-sectional view illustrating a state in which the reinforcing member according to the fifth embodiment of the present invention is fixed to the structure.

Hereinafter, a detailed description within a range overlapping with the above description may be omitted.

Referring to FIG. 7A, the reinforcing member may further include an adjusting portion 5300 which adjusts whether a certain fluid flows in a reinforcing portion 5100.

A restricting portion 5200 may include a body portion 5210, which restricts a shift in position of the reinforcing portion 5100 on the basis of the restricting portion 5200, a first fixing portion 5220, which fixes the body portion 5210 provisionally to the structure 1, and a second fixing portion 5230 which fixes the body portion 5210 to the structure 1.

Also, the body portion 5210 may include a holding portion 5212, which restricts a shift in position of the reinforcing portion 5100 on the basis of the body portion 5210, and a connecting portion 5211 which is connected to the holding portion 5212, the second fixing portion 5230, the first fixing portion 5220 and the adjusting portion 5300.

Also, the first fixing portion 5220 may include a 1-1 fixing portion 5221 connected to the connecting portion 5211 and a 1-2 fixing portion 5222 connected to the 1-1 fixing portion 5221 and configured to fix the connecting portion 5211 provisionally to the structure 1.

Also, the second fixing portion 5230 may include a 2-1 fixing portion 5231, which is connected to a bottom surface of the connecting portion 5211, and a 2-2 fixing portion 5232 which is connected to the connecting portion 5211 to surround a side surface and a top surface of the connecting portion 5211.

The connecting portion 5211 may include a placement surface 5211c, a through surface 5211b, and an insertion surface 5211a, which are formed of inner surfaces of the connecting portion 5211, and a detailed description may be omitted within a range overlapping with the above description.

An inner surface of the connecting portion 5211, which is formed by depressing a part of one surface of the connecting portion 5211, may be referred to as a placement surface 5211c.

An inner surface of the connecting portion 5211, which is formed by depressing a part of the other surface of the connecting portion 5211, may be referred to as a insertion surface 5211a.

An inner surface of the connecting portion 5211 formed by passing through the connecting portion 5211 from one surface to the other surface thereof to provide a connecting space S5211b, which allows a disposition space S5211c and an insertion space S5212 to communicate with each other, may be referred to as the through surface 5211b.

The adjusting portion 5300 may be disposed on the placement surface 5211c.

The adjusting portion 5300 may be formed as a layer which is connected to the placement surface 5211c and has a certain height.

The placement surface 5211c may provide the disposition space S5211c in which the adjusting portion 5300 is disposed.

An inner surface of the adjusting portion 5300 may provide a flow space S5300.

The through surface 5211b may provide the connecting space S5211b which allows the flow space S5300 and a reinforcing space S5100, which is an internal space of the reinforcing portion 5100, to communicate with each other.

The holding portion 5212 may be connected to the insertion surface 5211a and may provide the insertion space S5212 in which the reinforcing portion 5100 is inserted.

The reinforcing portion 5100 may be inserted into the insertion space S5212 provided by an inner surface of the holding portion 5212.

The holding portion 5212 may be connected to the insertion surface 5211a and may form a layer having a certain height.

The flow space S5300 may communicate with the reinforcing space S5100 due to the connecting space S5211b.

The adjusting portion 5300 may be disposed on the connecting portion 5211 to be opposite to the holding portion 5212 on the basis of a center of the connecting portion 5211.

As an example, the holding portion 5212 may be a structural foam.

However, the present invention is not limited thereto and is variously modifiable within a degree which is obvious to one of ordinary skill in the art.

Referring to FIG. 8A, the reinforcing portion 5100 may be inserted into the insertion space S5212 such that the reinforcing portion 5100 comes into contact with an inner surface of the insertion surface 5211a.

Also, the body portion 5210 may be fixed provisionally to the structure 1 by the first fixing portion 5220.

Also, the second fixing portion 5230 may come into contact with the structure 1.

Referring to FIG. 8B, when heat acts on the reinforcing member, the adjusting portion 5300 changes from the first state to the second state so as to prevent a certain fluid from flowing to the reinforcing space S5100 or from flowing from the reinforcing space S5100 to an outside of the connecting portion 5211, the holding portion 5212 changes from a first state to a second state so as to restrict a shift in position of the reinforcing portion 5100 on the basis of the body portion 5210, and the second fixing portion 5230 changes from a first state to a second state such that the body portion 5210 may be fixed to the structure 1.

As an example, when heat acts on the second fixing portion 5230, the 2-1 fixing portion 5231 and the 2-2 fixing portion 5232 change from a first state to a second state such that the body portion 5210 may be fixed to the lower structure 1b by the 2-1 fixing portion 5231 and may be fixed to the upper structure 1a by the 2-2 fixing portion 5232.

Figure 9A:
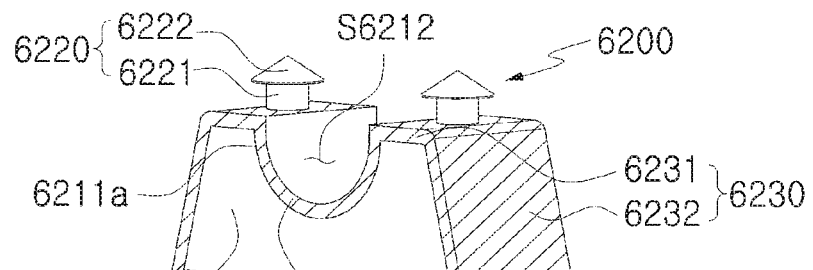
FIGS. 9A to 9C are views illustrating a restricting portion included in a reinforcing member according to a sixth embodiment of the present invention and a coupling relation between the restricting portion, a reinforcing portion, and the structure.
Figure 9B:
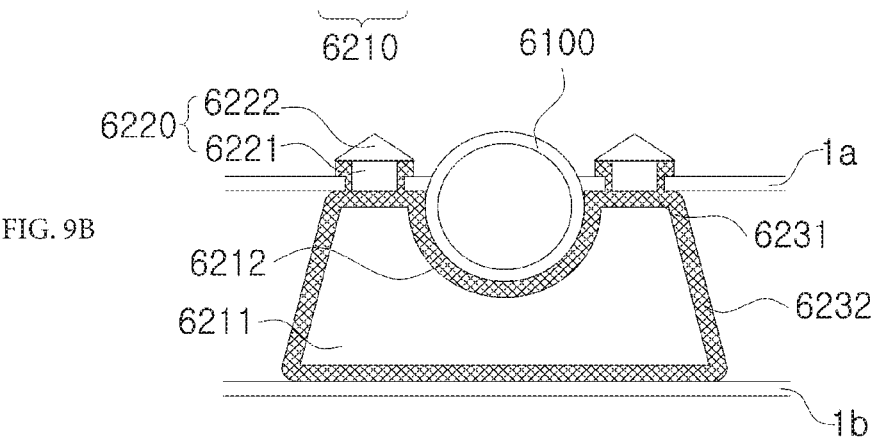
Figure 9C:
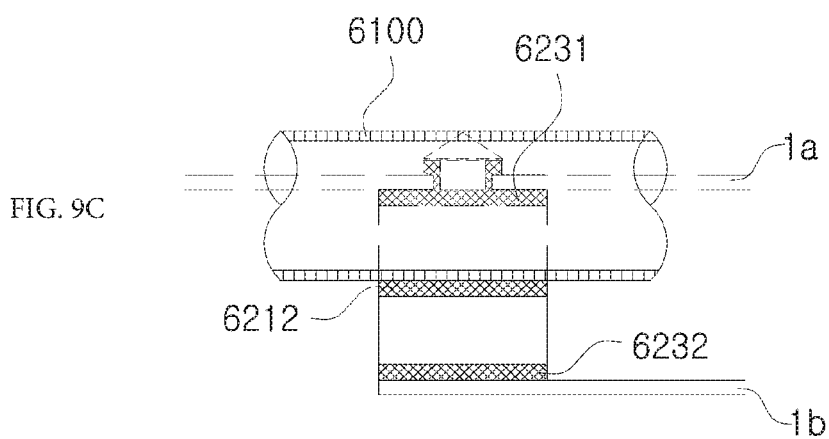

FIGS. 9A to 9C are views illustrating a restricting portion included in a reinforcing member according to a sixth embodiment of the present invention and a coupling relation between the restricting portion, a reinforcing portion, and a structure.

In detail, FIG. 9A is a perspective view illustrating the restricting portion included in the reinforcing member according to the sixth embodiment of the present invention, FIG. 9B is a view illustrating a state in which the reinforcing member according to the sixth embodiment of the present invention is fixed to the structure, and FIG. 9C is a view illustrating a state in which the reinforcing member according to the sixth embodiment of the present invention is fixed to the structure.

Hereinafter, a detailed description within a range overlapping with the above description may be omitted.

Referring to FIG. 9A, a restricting portion 6200 may include a body portion 6210, which restricts a shift in position of a reinforcing portion 6100 on the basis of the restricting portion 6200, a first fixing portion 6220, which fixes the body portion 6210 provisionally to the structure 1 (refer to FIG. 1), and a second fixing portion 6230 which fixes the body portion 6210 to the structure 1.

Here, the body portion 6210 may include a holding portion 6212, which restricts a shift in position of the reinforcing portion 6100 on the basis of the body portion 6210, and a connecting portion 6211 which is connected to the holding portion 6212, the second fixing portion 6230, and the first fixing portion 6220.

Also, the first fixing portion 6220 may include a 1-1 fixing portion 6221 connected to the connecting portion 6211 and a 1-2 fixing portion 6222 connected to the 1-1 fixing portion 6221 and configured to fix the connecting portion 6211 provisionally to the structure 1.

Also, the second fixing portion 6230 may include a 2-1 fixing portion 6231, which is connected to a top surface of the connecting portion 6211, and a 2-2 fixing portion 6232 which is connected to the connecting portion 6211 to surround a side surface and a bottom surface of the connecting portion 6211.

The connecting portion 6211 may include a mounting surface 6211a which is depressed from the top surface of the connecting portion 6211 to provide a certain space.

The holding portion 6212 may be connected to or disposed on the mounting surface 6211a.

The holding portion 6212 may form a layer having a certain height on the basis of the mounting surface 6211a.

The holding portion 6212 may be disposed in a direction which is the same as those of the first fixing portion 6220 and the second fixing portion 6230 on the basis of the connecting portion 6211.

As a detailed example, the first fixing portion 6220 and the 2-1 fixing portion 6231 may be formed on the top surface of the connecting portion 6211 and the 2-1 fixing portion 6231 may be connected to the holding portion 6212.

An upper surface of the holding portion 6212 may provide a mounting space S6212 in which the reinforcing portion 6100 is mountable.

In detail, the connecting portion 6211 may include the mounting surface 6211a, which is depressed from the top surface of the connecting portion 6211 and provides a certain space, and the holding portion 6212 may be disposed on the mounting surface 6211a and may provide the mounting space S6212.

The second fixing portion 6230 may be formed as a layer which comes into contact with the top surface of the connecting portion 6211 and has a certain height.

Referring to FIG. 9A, the reinforcing portion 6100 may be disposed in the mounting space S6212, and the body portion 6210 may be fixed provisionally to the structure 1 by the first fixing portion 6220.

Referring to FIGS. 9B and 9C, when heat acts on the reinforcing member, the holding portion 6212 may change from the first state to the second state so as to restrict a shift in position of the reinforcing portion 6100 on the basis of the body portion 6210, and the second fixing portion 6230 may change from the first state to the second state such that the body portion 6210 may be fixed to the structure 1.

As an example, the body portion 6210 may be fixed provisionally to the upper structure 1a by the first fixing portion 6220. When heat acts on the second fixing portion 6230, the 2-1 fixing portion 6231 and the 2-2 fixing portion 6232 change from the first state to the second state such that the body portion 6210 may be fixed to the upper structure 1a by the 2-1 fixing portion 6231 and the body portion 6210 may be fixed to the lower structure 1b by the 2-2 fixing portion 6232.

Figure 10:
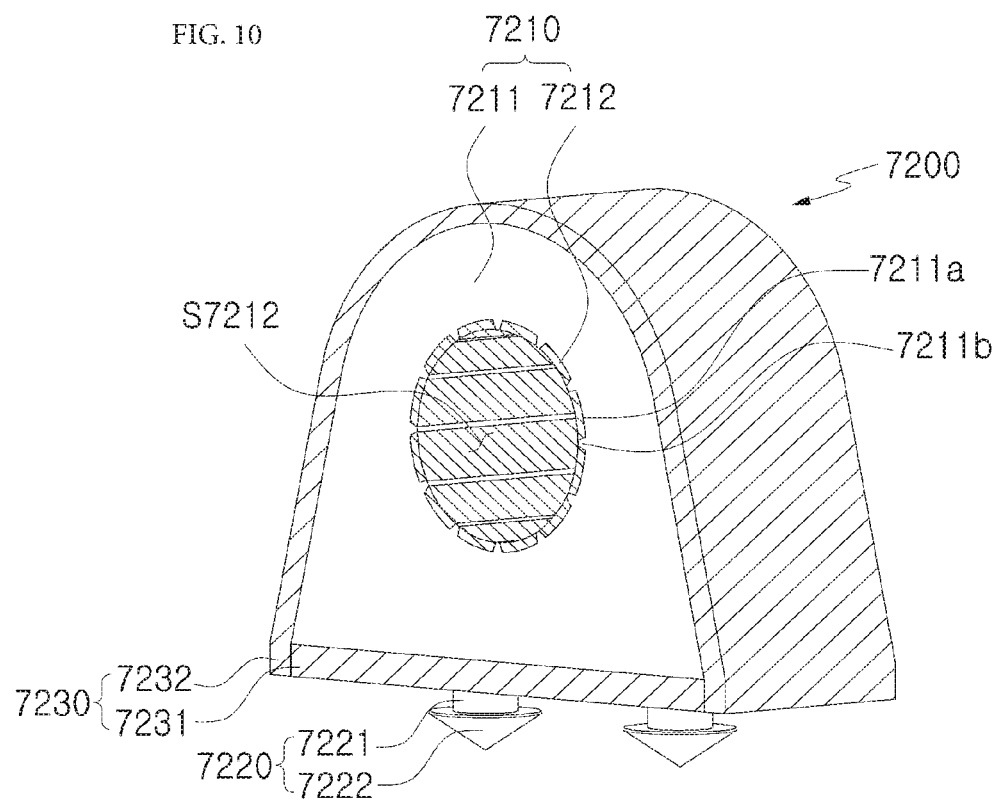
FIG. 10 is a view illustrating a restricting portion included in a reinforcing member according to a seventh embodiment of the present invention.

FIG. 10 is a view illustrating a restricting portion included in a reinforcing member according to a seventh embodiment of the present invention.

Hereinafter, a detailed description within a range overlapping with the above description may be omitted.

Referring to FIG. 10, a restricting portion 7200 may include a body portion 7210, which restricts a shift in position of a reinforcing portion on the basis of the restricting portion 7200, a first fixing portion 7220, which fixes the body portion 7210 provisionally to the structure, and a second fixing portion 7230 which fixes the body portion 7210 to the structure.

Also, the body portion 7210 may include a holding portion 7212, which restricts a shift in position of the reinforcing portion on the basis of the body portion 7210, and a connecting portion 7211 which is connected to the holding portion 7212, the second fixing portion 7230, and the first fixing portion 7220.

Also, the first fixing portion 7220 may include a 1-1 fixing portion 7221 connected to the connecting portion 7211 and a 1-2 fixing portion 7222 connected to the 1-1 fixing portion 7221 and configured to fix the connecting portion 7211 provisionally to the structure 1.

Also, the second fixing portion 7230 may include a 2-1 fixing portion 7231, which is connected to a bottom surface of the connecting portion 7211, and a 2-2 fixing portion 7232 which is connected to the connecting portion 7211 to surround a side surface and a top surface of the connecting portion 7211.

The connecting portion 7211 may include an insertion surface 7211a which is formed to pass through the connecting portion 7211 from one surface to the other surface thereof.

The connecting portion 7211 may include a pressurizing portion 7211b formed to protrude from the insertion surface 7211a.

A plurality of such pressurizing portions 7211b may be formed on the insertion surface 7211a, and the holding portion 7212 may be disposed between the pressurizing portions 7211b.

The pressurizing portions 7211b and the holding portion 7212 may provide an insertion space S7212 in which the reinforcing portion is inserted.

When the reinforcing portion is inserted into the insertion space S7212, the reinforcing portion may be fixed provisionally by the pressurizing portions 7211b.

Afterwards, when heat acts on the holding portion 7212, the holding portion 7212 changes from a first state to a second state such that the reinforcing portion may be fixed to the connecting portion 7211.

Figure 11:
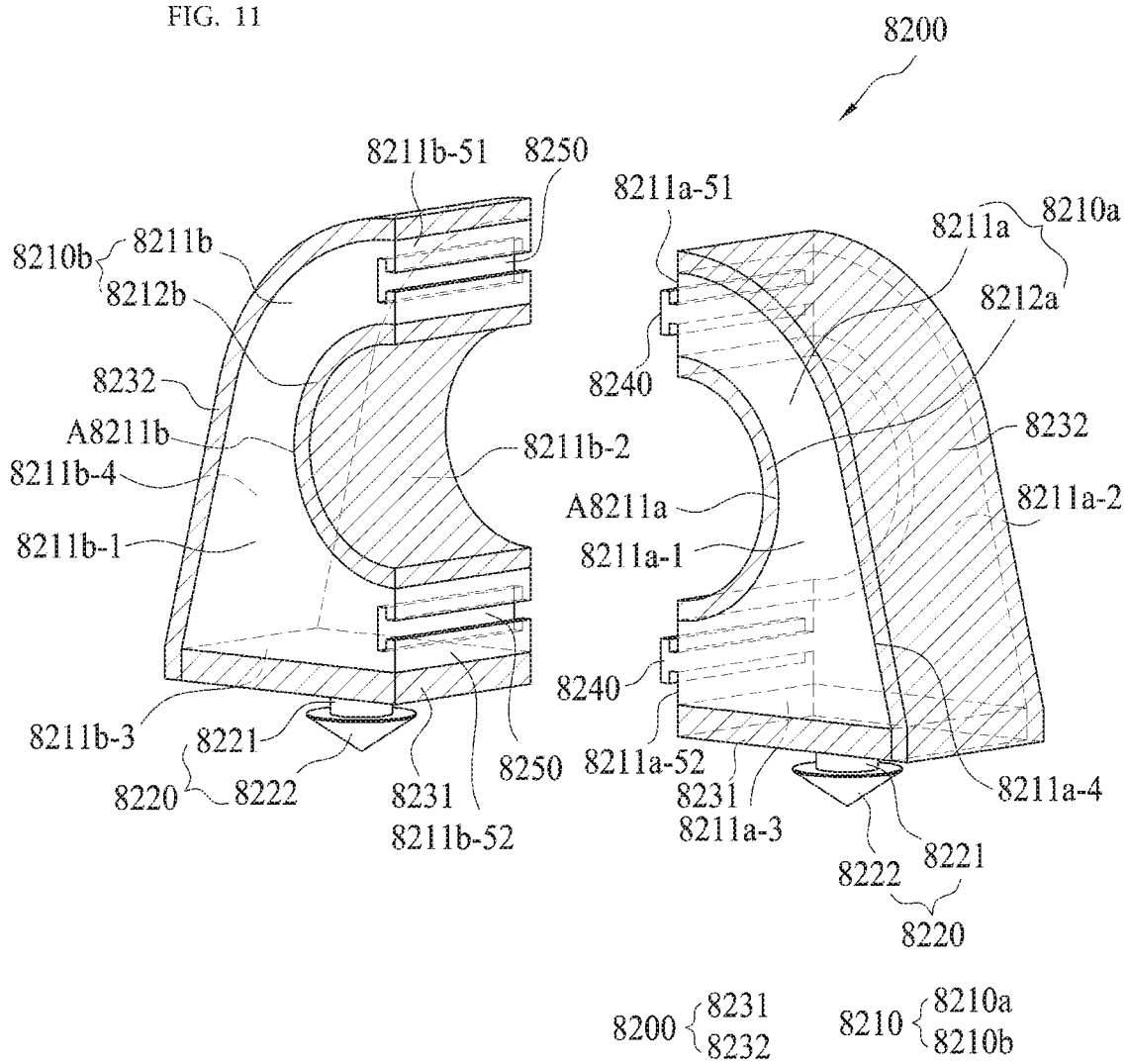
FIG. 11 is a view illustrating a restricting portion included in a reinforcing member according to an eighth embodiment of the present invention.

FIG. 11 is a view illustrating a restricting portion included in a reinforcing member according to an eighth embodiment of the present invention.

Hereinafter, a detailed description within a range overlapping with the above description may be omitted.

Referring to FIG. 11, a restricting portion 8200 of the reinforcing member according to the eighth embodiment of the present invention may include a body portion 8210, which restricts a shift in position of a reinforcing portion on the basis of the restricting portion 8200, a first fixing portion 8220, which fixes the body portion 8210 provisionally to the structure 1, and a second fixing portion 8230 which fixes the body portion 8210 to the structure 1.

Here, the body portion 8210 may include holding portions 8212a and 8212b, which restrict a shift in position of the reinforcing portion on the basis of the body portion 8210, and connecting portions 8211a and 8211b which are connected to the holding portions 8212a and 8212b, the second fixing portion 8230, and the first fixing portion 8220.

The connecting portions 8211a and 8211b may include insertion surfaces A8211 which are inner surfaces formed to pass through the connecting portions 8211a and 8211b from one surfaces to the other surfaces thereof.

Also, the first fixing portion 8220 may include a 1-1 fixing portion 8221 connected to the connecting portions 8211a and 8211b, and a 1-2 fixing portion 8222 connected to the 1-1 fixing portion 8221 and configured to fix the connecting portions 8211a and 8211b provisionally to the structure 1.

Also, the second fixing portion 8230 may include a 2-1 fixing portion 8231, which is connected to bottom surfaces of the connecting portions 8211a and 8211b, and a 2-2 fixing portion 8232 which is connected to the connecting portions 8211a and 8211b to surround side surfaces and top surfaces of the connecting portions 8211a and 8211b.

The body portion 8210 may include a first body portion 8210a and a second body portion 8210b which is detachable from or attachable to the first body portion 8210a.

The body portion 8210 may be separated into the first body portion 8210a and the second body portion 8210b.

In detail, the first body portion 8210a may include a first holding portion 8212a and a first connecting portion 8211a, and the second body portion 8210b may include a second holding portion 8212b and a second connecting portion 8211b.

When the first body portion 8210a is coupled with the second body portion 8210b, the holding portions 8212a and 8212b may be provided by the first holding portion 8212a and the second holding portion 8212b.

Also, when the first body portion 8210a is coupled with the second body portion 8210b, the connecting portions 8211a and 8211b may be provided by a first connecting portion 8211a and a second connecting portion 8211b.

The connecting portions 8211a and 8211b may include a first connecting portion 8211a and a second connecting portion 8211b which is detachable from or attachable to the first connecting portion 8211a.

The connecting portions 8211a and 8211b may be separated into the first connecting portion 8211a and the second connecting portion 8211b.

A plurality of such first fixing portions 8220 may be formed.

As an example, one of the first fixing portions 8220 may be connected to a bottom surface of the first connecting portion 8211a, and one of the first fixing portions 8220 may be connected to a bottom surface of the second connecting portion 8211b.

However, the present invention is not limited thereto, and the number of the first fixing portions 8220 connected to the connecting portions 8211a and 8211b are variously modifiable within a degree which is obvious to one of ordinary skill in the art.

The connecting portions 8211a and 8211b may be separated into the first connecting portion 8211a and the second connecting portion 8211b on the basis of a virtual line which vertically extends including centers of the connecting portions 8211a and 8211b.

The reinforcing member according to the eighth embodiment of the present invention may further include a fastening portion 8240 which extends from the first connecting portion 8211a and is coupled to the second connecting portion 8211b such that the first connecting portion 8211a and the second connecting portion 8211b are fastened to each other.

The fastening portion 8240 may be formed to extend from a part of a surface of the first connecting portion 8211a which comes into contact with the second connecting portion 8211b.

As a detailed example, the first connecting portion 8211a may have an external shape formed of a first one connecting surface 8211a-1 which is one surface of the first connecting portion 8211a, a first other connecting surface 8211a-2 which is the other surface of the first connecting portion 8211a and opposite to the first one connecting surface 8211a-1, a first bottom connecting surface 8211a-3 which is a bottom surface of the first connecting portion 8211a, a first outer connecting surface 8211a-4 which is a surface adjacent to the first one connecting surface 8211a-1, the first other connecting surface 8211a-2, and the first bottom connecting surface 8211a-3, and first inner connecting surfaces 8211a-51 and 8211a-52 which are adjacent to the first one connecting surface 8211a-1, the first other connecting surface 8211a-2, and the first bottom connecting surface 8211-3 and are opposite to the first outer connecting surface 8211a-4.

The first outer connecting surface 8211a-4 may be formed to be rounded.

The first inner connecting surfaces 8211a-51 and 8211a-52 may include a 1-1 inner connecting surface 8211a-51 which is adjacent upward from an insertion surface A8211a formed on the first connecting portion and a 1-2 inner connecting surface 8211a-52 which is adjacent downward from the insertion surface A8211a formed on the first connecting portion.

The fastening portion 8240 may be formed to protrude in one direction from the 1-1 inner connecting surface 8211a-51.

As an example, the fastening portion 8240 may be formed to protrude from the 1-1 inner connecting surface 8211a-51 toward a normal vector of the 1-1 inner connecting surface 8211a-51.

Also, the fastening portion 8240 may be formed to protrude in one direction from the 1-2 inner connecting surface 8211a-52.

As a detailed example, the second connecting portion 8211b may have an external shape formed of a second one connecting surface 8211b-1 which is one surface of the second connecting portion 8211b, a second other connecting surface 8211b-2 which is the other surface of the second connecting portion 8211b and is opposite to the second one connecting surface 8211b-1, a second bottom connecting surface 8211b-3 which is a bottom surface of the second connecting portion 8211b, a second outer connecting surface 8211b-4 which is a surface adjacent to the second one connecting surface 8211b-1, the second other connecting surface 8211b-2, and the second bottom connecting surface 8211b-3, and second inner connecting surfaces 8211b-51 and 8211b-52 which are adjacent to the second one connecting surface 8211b-1, the second other connecting surface 8211b-2, and the second bottom connecting surface 8211b-3 and are opposite to the second outer connecting surface 8211b-4.

The second outer connecting surface 8211b-4 may be formed to be rounded.

The second inner connecting surfaces 8211b-51 and 8211b-52 may include a 2-1 inner connecting surface 8211b-51 which is adjacent upward from an insertion surface A8211b formed on the second connecting portion and a 2-2 inner connecting surface 8211b-52 which is adjacent downward from the insertion surface A8211a formed on the second connecting portion.

A depressed portion 8250, in which the fastening portion 8240 is insertable, may be formed by depressing a part of the 2-1 inner connecting surface 8211b-51.

As an example, the depressed portion 8250 may be formed by depressing a part of the 2-1 inner connecting surface 8211b-51 to pass through from the second one connecting surface 8211b-1 to the second other connecting surface 8211b-2.

Similarly, the depressed portion 8250, in which the fastening portion 8240 is insertable, may be formed by depressing a part of the 2-2 inner connecting surface 8211b-52.

As a detailed example, the reinforcing portion is mountable on the holding portions 8212a and 8212b, which are disposed on the insertion surface A8211b formed on the second connecting portion, in a first state.

Next, the fastening portion 8240 connected to the 1-1 inner connecting surface 8211a-51 may be inserted into the depressed portion 8250 formed in the 2-1 inner connecting surface 8211b-51, and the fastening portion 8240 connected to the 1-2 inner connecting surface 8211a-52 may be inserted into the depressed portion 8250 formed in the 2-2 inner connecting surface 8211b-52.

Therefore, the 1-1 inner connecting surface 8211a-51 and the 2-1 inner connecting surface 8211b-51 come into contact with each other and the 2-1 inner connecting surface 8211b-51 and the 2-2 inner connecting surface 8211b-52 come into contact with each other such that the first connecting portion 8211a and the second connecting portion 8211b may be fastened to each other.

Therefore, inner surfaces of the holding portions 8212a and 8212b in the first state which are disposed on the insertion surface A8211a formed on the first connecting portion may come into contact with the reinforcing portion.

Due to this coupling method, the restricting portion 8200 may be easily coupled with the reinforcing portion.

Afterwards, a process of fixing the restricting portion to the reinforcing portion and a process of fixing the restricting portion to the structure may be performed through the above-described change in state of the fixing portion and the holding portion, and a detailed description may be omitted within a range overlapping with the above description.

Figure 12:
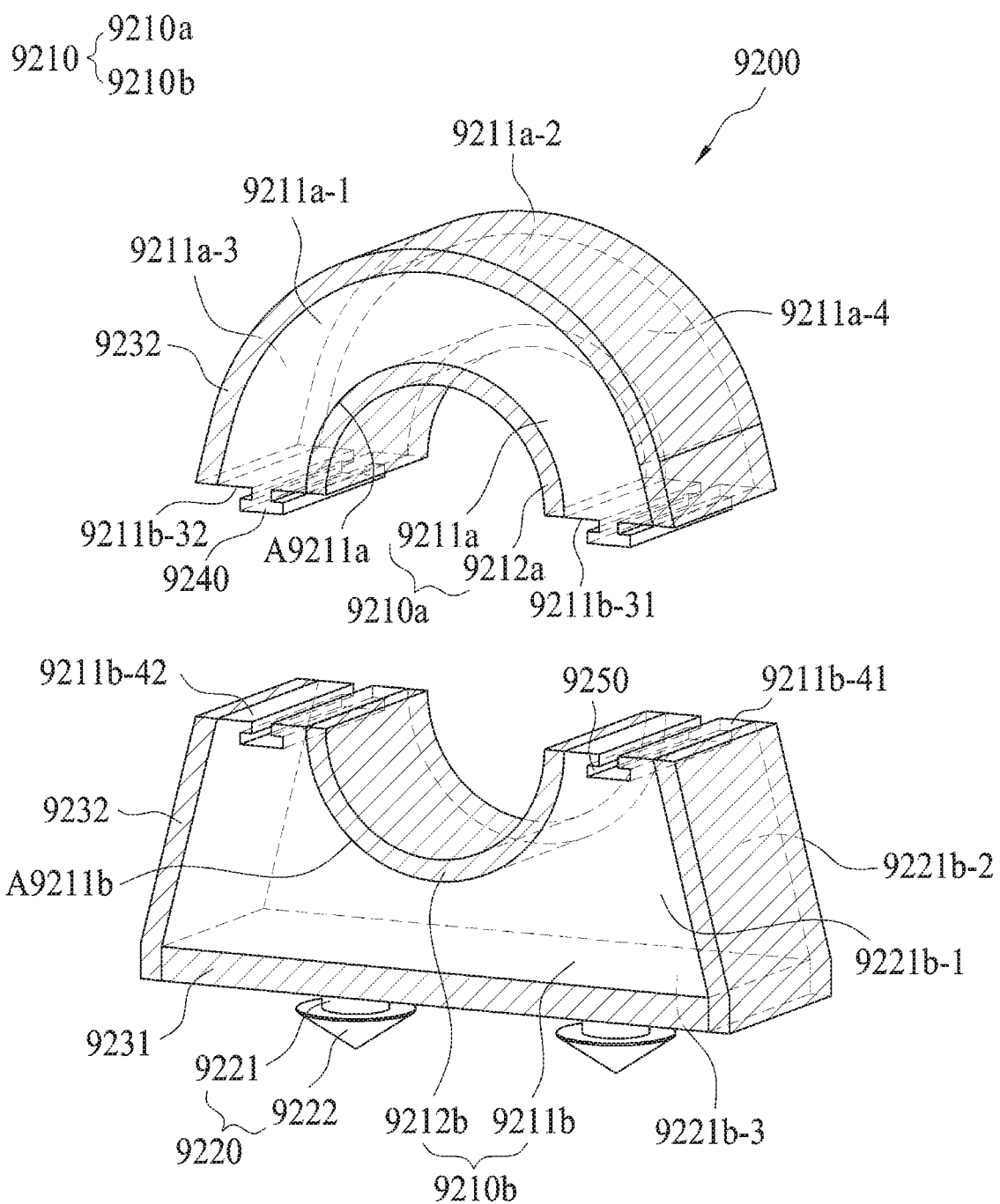
FIG. 12 is a view illustrating a restricting portion included in a reinforcing member according to a ninth embodiment of the present invention.

FIG. 12 is a view illustrating a restricting portion 9200 included in a reinforcing member according to a ninth embodiment of the present invention.

Hereinafter, a detailed description within a range overlapping with the above description may be omitted.

Referring to FIG. 12, the restricting portion 9200 of the reinforcing member according to the ninth embodiment of the present invention may include a body portion 9210, which restricts a shift in position of the reinforcing portion on the basis of the restricting portion 9200, a first fixing portion 9220, which fixes the body portion 9210 provisionally to the structure 1, and a second fixing portion 9230 which fixes the body portion 9210 to the structure 1.

Here, the body portion 9210 may include holding portions 9212a and 9212b, which restrict a shift in position of the reinforcing portion on the basis of the body portion 9210, and connecting portions 9211a and 9211b which are connected to the holding portions 9212a and 9212b, the second fixing portion 9230, and the first fixing portion 9220.

The connecting portions 9211a and 9211b may include insertion surfaces A9211a and A9211b which are inner surfaces formed to pass through the connecting portions 9211a and 9211b from one surfaces to the other surfaces thereof.

Also, the first fixing portion 9220 may include a 1-1 fixing portion 9221 connected to the connecting portions 9211a and 9211b and a 1-2 fixing portion 9222 connected to the 1-1 fixing portion 9221 and configured to fix the connecting portions 9211a and 9211b provisionally to the structure 1.

Also, the second fixing portion 9230 may include a 2-1 fixing portion 9231, which is connected to bottom surfaces of the connecting portions 9211a and 9211b, and a 2-2 fixing portion 9232 which is connected to a side surface of a second connecting portion 9211b, which will be described below, and connected to a side surface and a top surface of a first connecting portions 9211a, which will be described below.

The body portion 9210 may include a first body portion 9210a and a second body portion 9210b which is detachable from or attachable to the first body portion 9210a.

The body portion 9210 may be separated into the first body portion 9210a and the second body portion 9210b.

In detail, the first body portion 9210a may include a first holding portion 9212a and the first connecting portion 9211a, and the second body portion 9210b may include the second holding portion 9212b and a second connecting portion 9211b.

When the first body portion 9210a is coupled with the first body portion 9210a, the holding portions 9212a and 9212b may be provided by the first holding portion 9212a and the second holding portion 9212b.

Also, when the first body portion 9210a is coupled with the first body portion 9210a, the connecting portions 9211a and 9211b may be provided with the first connecting portion 9211a and the second connecting portion 9211b.

The connecting portions 9211a and 9211b may include the first connecting portion 9211a and the second connecting portion 9211b which is detachable from or attachable to the first connecting portion 9211a.

On the basis of a virtual horizontal line which includes centers of the connecting portions 9211a and 9211b, the connecting portions 9211a and 9211b may be separated into the first connecting portion 9211a and the second connecting portion 9211b.

The reinforcing member according to the ninth embodiment of the present invention may further include a fastening portion 9240 which extends from the first connecting portion 9211a and is coupled to the second connecting portion 9211b such that the first connecting portion 9211a and the second connecting portion 9211b are fastened to each other.

As a detailed example, the first connecting portion 9211a may have an external shape formed of a first one connecting surface 9211a-1 which is one surface of the first connecting portion 9211a, a first other connecting surface 9211a-2 which is the other surface of the first connecting portion 9211a and is opposite to the first one connecting surface 9211a-1, first bottom connecting surfaces 9211a-31 and 9211a-32 which are bottom surfaces of the first connecting portion 9211a, and a first top connecting surface 9211a-4 which is a surface adjacent to the first one connecting surface 9211a-1 and the first other connecting surface 9211a-2 and is opposite to the first bottom connecting surfaces 9211a-31 and 9211a-32.

The first top connecting surface 9211a-4 may be formed to be rounded.

The first bottom connecting surfaces 9211a-31 and 9211a-32 may include a 1-1 bottom connecting surface 9211a-31, which is adjacent in one side to the insertion surface A9211a formed on the first connecting portion 9211a, and a 1-2 bottom connecting surface 9211a-32 which is adjacent in the other side to the insertion surface A9211a formed on the first connecting portion 9211a.

The fastening portion 9240 may be formed to protrude in one direction from the 1-1 bottom connecting surface 9211a-31.

As an example, the fastening portion 9240 may be formed to protrude downward from the 1-1 bottom connecting surface 9211a-31.

Also, the fastening portion 9240 may be formed to protrude downward from the 1-2 bottom connecting surface 9211a-32.

As a detailed example, the second connecting portion 9211b may have an external shape formed of a second one connecting surface 9211b-1 which is one surface of the second connecting portion 9211b, a second other connecting surface 9211b-2 which is the other surface of the second connecting portion 9211b, and is opposite to the second one connecting surface 9211b-1, a second bottom connecting surface 9211b-3 which is a bottom surface of the second connecting portion 9211b, a second outer connecting surface which is a surface adjacent to the second one connecting surface 9211b-1, the second other connecting surface 9211b-2, and the second bottom connecting surface 9211b-3, and second top connecting surfaces 9211b-41 and 9211b-42 which are adjacent to the second one connecting surface 9211b-1, the second other connecting surface 9211b-2, and the second outer connecting surface and are opposite to the second bottom connecting surface 9211b-3.

The second top connecting surfaces 9211b-41 and 9211b-42 may include a 2-1 top connecting surface 9211b-41 which is adjacent on one side to an insertion surface A9211b formed on the second connecting portion 9211b and a 2-2 top connecting surface 9211b-42 which is adjacent on the other side to the insertion surface A9211a formed on the second connecting portion 9211b.

A depressed portion 9211, in which the fastening portion 9240 is insertable, may be formed by depressing a part of the 2-1 top connecting surface 9211b-41.

As an example, the depressed portion 9250 may be formed by depressing a part of the 2-1 top connecting surface 9211b-41 to pass through from the second one connecting surface 9211b-1 to the second other connecting surface 9211b-2.

Similarly, the depressed portion 9250, in which the fastening portion 9240 is insertable, may be formed by depressing a part of the 2-2 top connecting surface 9211b-42.

As a detailed example, the reinforcing portion is mountable on the holding portions 9212a and 9212b in a first state, which are disposed on the insertion surface A9211b formed on the second connecting portion 9211b.

Next, the fastening portion 9240 connected to the 1-1 bottom connecting surface 9211a-31 may be inserted into the depressed portion 9250 formed in the 2-1 top connecting surface 9211b-41, and the fastening portion 9240 connected to the 1-2 bottom connecting surface 9211a-32 may be inserted into the depressed portion 9250 formed in the 2-2 top connecting surface 9211b-42.

Therefore, the 1-1 bottom connecting surface 9211a-31 and the 2-1 top connecting surface 9211b-41 come into contact with each other and the 1-2 bottom connecting surface 9211b-32 and the 2-2 top connecting surface 9211b-42 come into contact with each other such that the first connecting portion 9211a and the second connecting portion 9211b may be fastened to each other.

Therefore, inner surfaces of the holding portions 9212a and 9212b in the first state which are disposed on the insertion surface A9211a formed on the first connecting portion 9211a may come into contact with the reinforcing portion.

Due to such coupling method, the restricting portion 9200 may be easily coupled with the reinforcing portion.

Afterwards, a process of fixing the restricting portion to the reinforcing portion and a process of fixing the restricting portion to the structure may be performed through the above-described change in state of the fixing portion and the holding portions, and a detailed description may be omitted within a range overlapping with the above description.

The technical feature of dividing the connection portion, which is the technical concept added to the eighth embodiment and the ninth embodiment of the present invention may be applied to the first embodiment, the second embodiment, and the fourth embodiment to the seventh embodiment of the present invention, and a detailed description may be omitted within an overlapping range.

Here, unlike the above-described embodiments, the connecting portion may be divided on the basis of a virtual inclined plane including a center of the connecting portion.

As described above, a part where the connecting portion is divided is variously modifiable within a degree which is obvious to one of ordinary skill in the art.

Also, unlike the above-described embodiments, the connecting portion may be divided into three or more parts.

As described above, the number of divided parts of the connecting portion is variously modifiable within a degree which is obvious to one of ordinary skill in the art.

Figure 13:
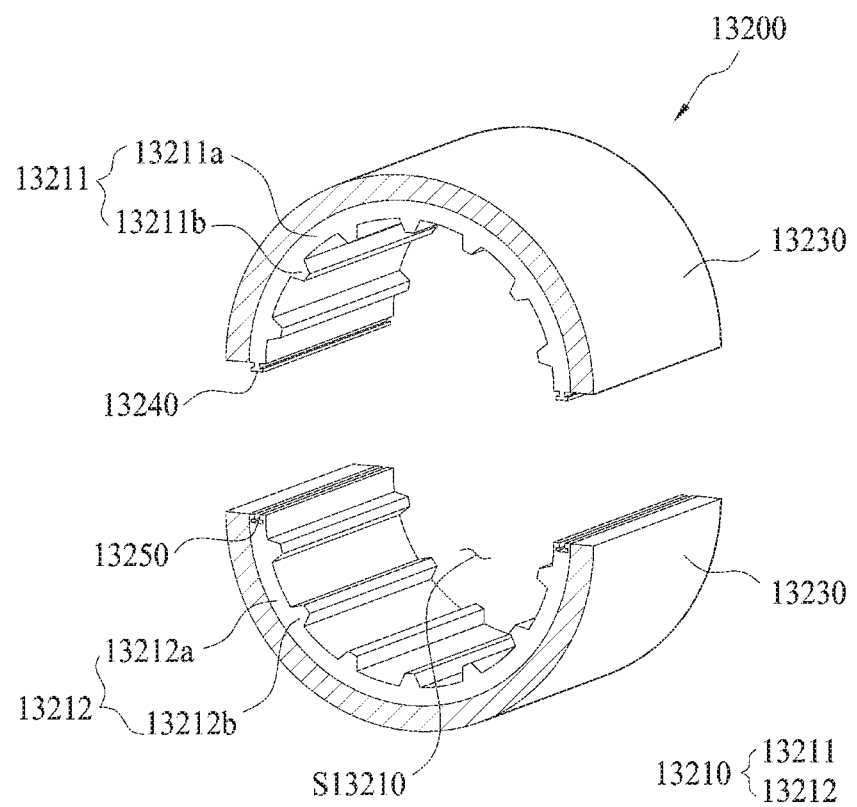
FIG. 13 is a view illustrating a restricting portion included in a reinforcing member according to a tenth embodiment of the present invention.

FIG. 13 is a view illustrating a restricting portion included in a reinforcing member according to a tenth embodiment of the present invention.

Referring to FIG. 13, a restricting portion 13200 may include a body portion 13210, which restricts a shift in position of a reinforcing portion on the basis of the restricting portion 13200, and a second fixing portion 13230 which fixes the body portion 13210 to a structure.

Here, the body portion 13210 may include holding portions 13211b and 13212b, which restrict a shift in position of the reinforcing portion on the basis of the body portion 13210, and connecting portions 13211a and 13212a which are connected to the holding portions 13211b and 13212b and the second fixing portion 13230.

The tenth embodiment of the present invention differs in comparison to the third embodiment of the present invention in whether the connecting portion is divided and in a fastening mechanism of the divided parts of the connecting portion.

Therefore, a detailed description on the reinforcing member according to the tenth embodiment of the present invention may be omitted within a range overlapping with the above description.

The body portion 13210 may include a first body portion 13211 and a second body portion 13212 which is detachable from or attachable to the first body portion 13211.

The body portion 13210 may be separated into the first body portion 13211 and the second body portion 13212.

In detail, the first body portion 13211 may include a first holding portion 13211b and a first connecting portion 13211a, and the second body portion 13212 may include a second holding portion 13212b and a second connecting portion 13212a.

When the first body portion 13211 is coupled with the second body portion 13212, the holding portions may be provided by the first holding portion 13211b and the second holding portion 13212b.

Also, when the first body portion 13211 is coupled with the second body portion 13212, a connecting portion may be provided by a first connecting portion 13211a and a second connecting portion 13212a.

The connecting portion may include the first connecting portion 13211a and the second connecting portion 13212a which is detachable from or attachable to the first connecting portion 13211a.

The connecting portions may be separated into the first connecting portion 13211a and the second connecting portion 13212a.

The holding portion may be connected to each of the first connecting portion 13211a and the second connecting portion 13212a.

The reinforcing member according to the tenth embodiment of the present invention may further include a fastening portion 13240 which extends from the first connecting portion 13211a and is coupled to the second connecting portion 13212a such that the first connecting portion 13211a and the second connecting portion 13212a are fastened to each other.

As an example, the fastening portion 13240 may be formed to protrude downward from both ends of the first connecting portion 13211a.

The fastening portion 13240 may be formed to extend in a longitudinal direction of the first connecting portion 13211a.

Also, a depressed portion 13250 may be formed by depressing parts of both ends of the second connecting portion 13212a.

The depressed portion 13250 may be formed to extend in a longitudinal direction of the second connecting portion 13212a.

As a detailed example, a part of the reinforcing portion may be disposed on the insertion space S13210 provided by the second connecting portion 13212a.

Next, the fastening portion 13240 connected to the first connecting portion 13211a may be inserted into the depressed portion 13250 formed in the second connecting portion 13212a such that the first connecting portion 13211a and the second connecting portion 13212a may be fastened to each other.

Here, the second fixing portion 13230 may be in a first state.

Afterwards, a fixing process may be performed through the above-described change in state and a detailed description thereof may be omitted within a range overlapping with the above description.

The above-described reinforcing member may be disposed in a transport device and may improve durability of the transport device.

As an example, the reinforcing member may be disposed in an internal space of a side rail of a vehicle but is not limited thereto and is variously modifiable within a degree which is obvious to one of ordinary skill in the art.

According to the embodiments, a reinforcing member may secure impact resistance of a transport device without a decrease in fuel efficiency.

Also, a manufacturing process may be shortened.

Also, competitive pricing may be secured.

However, effects of the present invention will not be limited to the above-described effects, and unstated effects can be clearly understood by those skilled in the art through the specification and the attached drawings.

Throughout the attached drawings, for clearer expression of the technical concept of the present invention, components unrelated or less related to the technical concept of the present invention have been simply expressed or omitted.

Although the components and features of the present invention have been described above on the basis of the embodiments of the present invention, it is obvious to those skilled in the art that the present invention is not limited thereto and a variety of changes and modifications may be made without departing from the concept and scope of the present invention. Therefore, it should be noted that the changes or modifications are included in the following claims.

What is claimed is:

1. A reinforcing member for improving durability of a structure which receives an external force, the reinforcing member comprising:

a reinforcing portion configured to improve the durability of the structure; and a restricting portion which is fixed, in position, to the structure while restricting a shift in position of the reinforcing portion such that the reinforcing portion is located in a predetermined position on the basis of the structure, wherein the restricting portion comprises a body portion, which restricts a shift in position of the reinforcing portion on the basis of the restricting portion, a first fixing portion, which fixes the body portion provisionally to the structure, and a second fixing portion which fixes the body portion to the structure, wherein the body portion is fixed provisionally to the structure by the first fixing portion and then is fixed to the structure by the second fixing portion, wherein the second fixing portion does not fix the body portion to the structure in a first state and fixes the body portion to the structure in a second state, and wherein the body portion is fixed provisionally to the structure by the first fixing portion and then is fixed to the structure due to a change of the second fixing portion from the first state to the second state.

2. The reinforcing member of claim 1, wherein the second fixing portion changes from the first state to the second state due to heat.

3. The reinforcing member of claim 1, wherein the first fixing portion is connected to the body portion, and wherein the second fixing portion fixes the body portion to the structure by fixing the first fixing portion and the structure in the second state.

4. A reinforcing member for improving durability of a structure which receives an external force, the reinforcing member comprising:

a reinforcing portion configured to improve the durability of the structure; and a restricting portion which is fixed, in position, to the structure while restricting a shift in position of the reinforcing portion such that the reinforcing portion is located in a predetermined position on the basis of the structure, wherein the restricting portion comprises a body portion, which restricts a shift in position of the reinforcing portion on the basis of the restricting portion, and a second fixing portion which fixes the body portion to the structure, wherein the body portion comprises a holding portion, which restricts a shift in position of the reinforcing portion on the basis of the body portion, and a connecting portion connected to the holding portion and the second fixing portion, wherein the second fixing portion does not fix the connecting portion to the structure in a first state and fixes the connecting portion to the structure in a second state, and wherein the holding portion does not restrict the shift in position of the reinforcing portion on the basis of the body portion in the first state and restricts the shift in position of the reinforcing portion on the basis of the body portion in the second state.

5. The reinforcing member of claim 4, wherein the second fixing portion and the holding portion change from the first state to the second state due to heat.

6. A reinforcing member for improving durability of a structure which receives an external force, the reinforcing member comprising:

a reinforcing portion configured to improve the durability of the structure;

a restricting portion which is fixed, in position, to the structure while restricting a shift in position of the reinforcing portion such that the reinforcing portion is located in a predetermined position on the basis of the structure; and an adjusting portion which adjusts whether a certain fluid flows in the reinforcing member, wherein the adjusting portion allows the fluid to flow in the reinforcing member in a first state and to not flow in the reinforcing member in a second state.

7. The reinforcing member of claim 6, wherein the restricting portion provides a disposition space which communicates with a reinforcing space that is an internal space of the reinforcing portion such that the fluid flows into the reinforcing portion, and wherein the adjusting portion is disposed in the disposition space and adjusts whether the fluid flows through a change in state.

8. The reinforcing member of claim 7, wherein the restricting portion comprises a body portion, which restricts a shift in position of the reinforcing portion on the basis of the restricting portion, and a second fixing portion which fixes the body portion to the structure, wherein the second fixing portion does not fix the body portion to the structure in the first state and fixes the body portion to the structure in the second state, and wherein the adjusting portion and the second fixing portion change from the first state to the second state due to heat.

9. The reinforcing member of claim 8, wherein the body portion comprises a holding portion, which restricts a shift in position of the reinforcing portion on the basis of the body portion, and a connecting portion connected to the holding portion and the second fixing portion, wherein the holding portion does not restrict the shift in position of the reinforcing portion on the basis of the body portion in the first state and restricts the shift in position of the reinforcing portion on the basis of the body portion in the second state, and wherein the adjusting portion, the second fixing portion, and the holding portion change from the first state to the second state due to heat.

10. A reinforcing member for improving durability of a structure which receives an external force, the reinforcing member comprising:

a reinforcing portion configured to improve the durability of the structure; and a restricting portion which is fixed, in position, to the structure while restricting a shift in position of the reinforcing portion such that the reinforcing portion is located in a predetermined position on the basis of the structure, wherein the restricting portion comprises a body portion, which restricts a shift in position of the reinforcing portion on the basis of the restricting portion, a first fixing portion, which fixes the body portion provisionally to the structure, and a second fixing portion which fixes the body portion to the structure, and wherein the body portion comprises a first body portion and a second body portion, which is detachable from or attachable to the first body portion, and the body portion is fixed provisionally to the structure by the first fixing portion and then is fixed to the structure by the second fixing portion.

11. A transport device comprising the reinforcing member according to claim 1.

* * * * *